(12) United States Patent
Novitasari et al.

(10) Patent No.: US 12,198,680 B2
(45) Date of Patent: Jan. 14, 2025

(54) VOICE ACTIVITY DETECTION INTEGRATION TO IMPROVE AUTOMATIC SPEECH DETECTION

(71) Applicant: International Business Machines Corporation, Armonk, NY (US)

(72) Inventors: Sashi Novitasari, Ikoma (JP); Takashi Fukuda, Tokyo (JP); Gakuto Kurata, Tokyo (JP)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 274 days.

(21) Appl. No.: 17/815,798

(22) Filed: Jul. 28, 2022

(65) Prior Publication Data

US 2024/0038221 A1   Feb. 1, 2024

(51) Int. Cl.
  *G10L 25/78*   (2013.01)
  *G10L 15/06*   (2013.01)
  *G10L 15/16*   (2006.01)
  *G10L 15/20*   (2006.01)
  *G10L 15/22*   (2006.01)

(52) U.S. Cl.
  CPC .......... *G10L 15/16* (2013.01); *G10L 15/063* (2013.01); *G10L 15/20* (2013.01); *G10L 15/22* (2013.01); *G10L 25/78* (2013.01)

(58) Field of Classification Search
  CPC ....... G10L 15/16; G10L 15/063; G10L 15/20; G10L 15/22; G10L 25/78; G10L 25/30; G10L 25/03; G10L 25/84; G06N 3/044; G06N 3/0442; G06N 3/0464; G06N 3/084
  See application file for complete search history.

(56) References Cited

U.S. PATENT DOCUMENTS

| | | | | |
|---|---|---|---|---|
| 2018/0324518 | A1* | 11/2018 | Dusan | G06F 3/167 |
| 2020/0126538 | A1* | 4/2020 | Han | G10L 15/063 |
| 2020/0335091 | A1* | 10/2020 | Chang | G10L 15/16 |
| 2021/0142174 | A1 | 5/2021 | Chang et al. | |

(Continued)

OTHER PUBLICATIONS

Li, et al., "Long-Running Speech Recognizer: An End-to-End Multi-Task Learning Framework for Online ASR and VAD," arXiv:2103.01661v1 [eess.AS] Mar. 2, 2021.

(Continued)

*Primary Examiner* — Abul K Azad
(74) *Attorney, Agent, or Firm* — Amin, Turocy & Watson, LLP

(57) ABSTRACT

Systems, computer-implemented methods, and computer program products to facilitate multi-task training a recurrent neural network transducer (RNN-T) using automatic speech recognition (ASR) information are provided. According to an embodiment, a system can comprise a memory that stores computer executable components and a processor that executes the computer executable components stored in the memory. The computer executable components can include an RNN-T that can receive ASR information. The computer executable components can include a voice activity detection (VAD) model that trains the RNN-T using the ASR information, where the RNN-T can further comprise an encoder and a joint network. One or more outputs of the encoder can be integrated with the joint network and one or more outputs of the VAD model.

17 Claims, 15 Drawing Sheets

(56) References Cited

U.S. PATENT DOCUMENTS

| | | | |
|---|---|---|---|
| 2021/0304769 A1 | 9/2021 | Ye et al. | |
| 2021/0312905 A1 | 10/2021 | Zhao et al. | |
| 2022/0157297 A1* | 5/2022 | Dey | G10L 15/05 |
| 2022/0319506 A1* | 10/2022 | Heikinheimo | G10L 15/065 |
| 2023/0343332 A1* | 10/2023 | Huang | G10L 15/02 |

OTHER PUBLICATIONS

Tao, "End-to-End Audiovisual Speech Recognition System with Multitask Learning," In IEEE Transactions on Multimedia, vol. 23, pp. 1-11, Feb. 28, 2020, doi: 10.1109/TMM.2020.2975922.

Thomas, et al., "Analyzing Convolutional Neural Networks for Speech Activity Detection in Mismatched Acoustic Conditions," 2014 IEEE International Conference on Acoustics, Speech and Signal Processing (ICASSP), May 4-9, 2014, pp. 2519-2523, doi: 10.1109/ICASSP.2014.6854054.

Graves, et al., "Towards end-to-end speech recognition with recurrent neural networks," in Proceedings of the 31st International Conference on Machine Learning, 2014, pp. 1764-1772. [Online]. Available: https://proceedings.mlr.press/v32/graves14.html.

Chan, et al., "Listen, attend and spell: A neural network for large vocabulary conversational speech recognition," in Proc. ICASSP 2016, arXiv:1508.01211v2 [cs.CL] Aug. 20, 2015, pp. 4960-4964.

Dong, et al., "Speech-transformer: A norecurrence sequence-to-sequence model for speech recognition," in Proc. ICASSP 2018, 2018, pp. 5884-5888.

Graves, "Sequence transduction with recurrent neural networks," arXiv:1211.3711v1 [cs.NE] Nov. 14, 2012.

Li, et al., "Improving rnn transducer modeling for end-to-end speech recognition," in Proc. ASRU 2019. IEEE, 2019, pp. 114-121.

Li, et al., "Towards fast and accurate streaming end-to-end ASR," in Proc. ICASSP 2020, arXiv:2004.11544v2 [eess.AS] May 13, 2020, pp. 6069-6073.

Saon, et al., "Advancing rnn transducer technology for speech recognition," in Proc. ICASSP 2021. IEEE, 2021, pp. 5654-5658.

ITU-T, "A silence compression scheme for G.729 optimized for terminals conforming to recommendation v.70," ITU-T Recommendation G.729 Annex B, 1996. [Online]. Available: https://ci.nii.ac.jp/naid/10027284458/en/.

Woo, et al., "Robust voice activity detection algorithm for estimating noise spectrum," Electronics Letters, vol. 36, pp. 180-181, Feb. 2000.

Kingsbury, et al., "Robust speech recognition in noisy environments: The 2001 ibm spine evaluation system," in Proc. ICASSP 2002, vol. 1, 2002, pp. 1-53-1-56.

Dines, et al. "The segmentation of multichannel meeting recordings for automatic speech recognition," IDIAP, Tech. Rep., 2006.

Thomas, et al., "Analyzing convolutional neural networks for speech activity detection in mismatched acoustic conditions," in Proc. ICASSP 2014, 2014, pp. 2519-2523.

Kim, et al., "Voice activity detection using an adaptive context attention model," IEEE Signal Processing Letters, vol. 25, No. 8, pp. 1181-1185, 2018.

Braun, et al., "On training targets for noise-robust voice activity detection," in 2021 29th European Signal Processing Conference, 2021, pp. 421-425.

Yoshimura, et al., "Endto-end automatic speech recognition integrated with CTC-based voice activity detection," in Proc. ICASSP 2020, 2020, pp. 6999-7003.

Tian, et al., "Improving rnn transducer modeling for small-footprint keyword spotting," in Proc. ICASSP 2021, 2021, pp. 5624-5628.

Yang, et al., "Multi-task language modeling for improving speech recognition of rare words," in Proc. ASRU 2021. IEEE, 2021, pp. 1087-1093.

Sehgal, "A convolutional neural network smartphone app for real-time voice activity detection," IEEE Access, vol. 6, pp. 9017-9026, 2018.

Hinton, et al., "Distilling the knowledge in a neural network," arXiv:1503.02531v1 [stat.ML] Mar. 9, 2015, vol. 2, No. 7, 2015.

Futami, et al., "Distilling the Knowledge of BERT for Sequenceto-Sequence ASR," in Proc. Interspeech 2020, 2020, pp. 3635-3639.

Xu, et al., "A Lightweight Framework for Online Voice Activity Detection in the Wild," in Proc. Interspeech 2021, 2021, pp. 371-375.

Liu, et al., "Improving unsupervised style transfer in end-to-end speech synthesis with endto-end speech recognition," in 2018 IEEE Spoken Language Technology Workshop (SLT), 2018, pp. 640-647.

Baevski, et al., "Unsupervised speech recognition," Advances in Neural Information Processing Systems, vol. 34, 2021.

Drexler, et al., "Combining end-to-end and adversarial training for low-resource speech recognition," in 2018 IEEE Spoken Language Technology Workshop (SLT), 2018, pp. 361-368.

Tjandra, et al., "Machine speech chain," IEEE/ACM Transactions on Audio, Speech, and Language Processing, vol. 28, pp. 976-989, 2020.

Mell et al., The NIST Definition of Cloud Computing, Recommendations of the National Institute of Standards and Technology, NIST Special Publication 800-145, Sep. 2011, 7 pages.

* cited by examiner

ASR (WER%) and VAD (EER%) performance comparison on SWB and CH under noisy conditions at an average SNR 4.2 dB, MTL α = 1.0. Pre-trained teacher VAD EER 24.6% (700)

| System | ASR | | | | | | VAD |
|---|---|---|---|---|---|---|---|
| | Speech + Non-speech | | | Speech-only | | | |
| | SWB | CH | Avg. | SWB | CH | Avg. | |
| Standard RNN-T | | | | | | | |
| No aug | 20.5 | 34.4 | 27.5 | 13.5 | 29.7 | 21.6 | - |
| Aug | 15.5 | 29.3 | 22.4 | 13.9 | 33.9 | 23.9 | - |
| Single-task ASR-VAD feature integration | | | | | | | |
| Pre-enc | 15.9 | 32.6 | 24.3 | 14.5 | 45.2 | 29.9 | - |
| Post-enc | 15.1 | 29.4 | 22.2 | 14.1 | 34.1 | 24.1 | - |
| Multi-task ASR-VAD ($\beta=0.05$) | | | | | | | |
| MTL 1 | 15.1 | 29.5 | 22.3 | 13.9 | 34.1 | 24.0 | 23.9 |
| MTL 2 | 15.1 | 30.6 | 22.9 | 13.8 | 34.9 | 24.4 | 22.6 |
| MTL 3 | 15.1 | 30.0 | 22.5 | 13.8 | 37.1 | 25.5 | 22.0 |
| MTL 4 | 15.1 | 29.3 | 22.2 | 13.9 | 34.3 | 24.1 | 21.5 |
| Multi-task ASR-VAD ($\beta=0.01$) | | | | | | | |
| MTL 3 | 15.0 | 29.2 | 22.1 | 13.9 | 34.6 | 24.3 | 22.3 |
| MTL 4 | 14.8 | 29.2 | 22.0 | 13.8 | 34.6 | 24.2 | 21.1 |
| Multi-task ASR-VAD + VAD aux-data ($\beta=0.01$) | | | | | | | |
| MTL 1 | 15.1 | 30.6 | 22.9 | 13.8 | 36.2 | 25.0 | 29.1 |
| MTL 2 | 14.9 | 28.6 | 21.8 | 13.8 | 31.9 | 22.9 | 22.4 |
| MTL 3 | 15.6 | 27.7 | 21.7 | 13.9 | 31.8 | 22.9 | 22.2 |
| MTL 4 | 15.0 | 28.2 | 21.6 | 13.7 | 31.9 | 22.8 | 22.3 |

FIG. 7

WER(%) comparison on non-speech (noisy speech only) input. MTL α=1.0 and β=0.01 (800)

| System | SWB | CH | Avg. |
|---|---|---|---|
| Standard RNN-T (No aug) | 123.3 | 182.3 | 152.8 |
| Standard RNN-T (Aug) | 6.1 | 20.8 | 13.5 |
| Post-enc | 3.0 | 13.1 | 8.1 |
| MTL 4 | 7.3 | 18.1 | 12.7 |
| MTL 4 + VAD aux-data | 4.7 | 20.6 | 12.7 |

WER(%) comparison on audio input segmented using independent CNN-based VAD at an average SNR 4.2 dB. MTL α=1.0 and β=0.01 (802)

| System | Speech + Non-speech | | |
|---|---|---|---|
| | SWB | CH | Avg. |
| Standard RNN-T (No aug) | 21.8 | 35.9 | 28.9 |
| Standard RNN-T (Aug) | 19.9 | 35.3 | 27.6 |
| MTL 4 + VAD aux-data | 18.7 | 31.9 | 25. |

WER(%) investigation of acoustic customization capability in different SNR (dB) settings. MTL α=1.0 and β=0.01 (804)

| System | SNR | Speech + Non-speech | | Speech-only | |
|---|---|---|---|---|---|
| | | SWB+ CH | CC | SWB+ CH | CC |
| Standard ASR Aug | 14.4 | 15.8 | 66.1 | 15.2 | 54.9 |
| Post-enc | | 15.8 | 64.8 | 15.1 | 54.8 |
| MTL4 + VAD aux-data | | 16 | 64 | 14.7 | 53.7 |
| Standatrd ASR (Aug) | 4.2 | 22.4 | 73.3 | 23.9 | 65.6 |
| Post-enc | | 22.2 | 71.5 | 24.1 | 64 |
| MTL4 + VAD aux-data | | 21.6 | 70.8 | 22.8 | 62.9 |
| Standard ASR Aug | 1.4 | 35.3 | 79.5 | 37.5 | 74 |
| Post-enc | | 34.9 | 78.6 | 38.1 | 72.7 |
| MTL4 + VAD aux-data | | 33.9 | 77.9 | 36.4 | 71.4 |

ASR WER(%) comparison on manually segmented noisy speech (with car noise) MTL
α=1.0 and β=0.01 (808)

| System | SNR (avg. dB) | InternalCC Monaural Recording | InternalCC Separated Channel A | InternalCC Separated Channel B | SWB | CH |
|---|---|---|---|---|---|---|
| A. Standard ASR (SWB w/o aug) | 14.4 | 44.2 | 61.7 | 56.1 | 9.5 | 19.7 |
| B. Standard ASR | | 47.4 | 62.4 | 55.0 | 10.0 | 20.4 |
| C. MTL 3 (SWB) | | 47.5 | 61.9 | 55.1 | 9.8 | 20.7 |
| D. MTL 4 (SWB) | | 47.9 | 62.3 | 54.4 | 9.9 | 20.4 |
| E. MTL 3 (SWB + InternalCC-VAD) | | 45.9 | 60.5 | 53.8 | 9.8 | 19.6 |
| F. MTL 4 (SWB + InternalCC-VAD) | | 46.4 | 60.9 | 53.7 | 9.7 | 19.7 |
| A. Standard ASR (SWB w/o aug) | 4.2 | 58.2 | 70.3 | 62.4 | 13.5 | 29.7 |
| B. Standard ASR | | 63.1 | 70.8 | 62.8 | 13.9 | 33.9 |
| C. MTL 3 (SWB) | | 62.7 | 70.4 | 60.5 | 13.9 | 34.6 |
| D. MTL 4 (SWB) | | 63.1 | 70.4 | 60.5 | 13.8 | 34.6 |
| E. MTL 3 (SWB + InternalCC-VAD) | | 61.4 | 68.4 | 59.9 | 13.9 | 31.8 |
| F. MTL 4 (SWB + InternalCC-VAD) | | 61.1 | 69.0 | 58.7 | 13.7 | 31.9 |
| A. Standard ASR (SWB w/o aug) | 1.4 | 69.4 | 68.4 | 68.4 | 23.4 | 43.3 |
| B. Standard ASR | | 74.1 | 68.0 | 68.0 | 24.2 | 50.7 |
| C. MTL 3 (SWB) | | 73.9 | 66.7 | 66.7 | 22.9 | 51.5 |
| D. MTL 4 (SWB) | | 74.2 | 66.3 | 66.3 | 23.1 | 51.8 |
| E. MTL 3 (SWB + InternalCC-VAD) | | 72.8 | 64.7 | 64.7 | 23.6 | 50.2 |
| F. MTL 4 (SWB + InternalCC-VAD) | | 73.0 | 64.7 | 64.7 | 23.3 | 49.4 |

FIG. 8B

ASR WER(%) comparison on noisy audio in an average SNR 4 dB mixed with car noise sounds (808)

| System | Non-speech Only | Speech + Non-speech | | |
|---|---|---|---|---|
| | | SWB | CH | Internal CC |
| Standard ASR (SWB w/o aug.) | 152.8 | 20.5 | 34.4 | 76 |
| Standard ASR | 13.5 | 15.5 | 29.3 | 73.3 |
| MTL 3 (SWB) | 11.2 | 15 | 29.2 | 72.5 |
| MTL 4 (SWB) | 12.7 | 14.8 | 29.2 | 71.8 |
| MTL 3 (SWB + InternalCC-VAD) | 11.9 | 15.6 | 27.7 | 71.1 |
| MTL 4 (SWB + InternalCC-VAD) | 12.7 | 15 | 28.2 | 70.8 |

ASR WER(%) comparison on noisy audio in an average SNR 4 dB mixed with car noise sounds (810)

| System | Speech + Non-speech | |
|---|---|---|
| | SWB | CH |
| Standard ASR (SWB w/o aug.) | 21.8 | 35.9 |
| Standard ASR | 19.9 | 35.3 |
| MTL 3 (SWB) | 19.5 | 35.2 |
| MTL 4 (SWB) | 19.6 | 34.9 |
| MTL 3 (SWB + InternalCC-VAD) | 19.1 | 31.8 |
| MTL 4 (SWB + InternalCC-VAD) | 187 | 31.9 |

ASR WER(%) comparison on manually segmented noisy speech at different SNR levels (812)

| System | SNR (dB) | Speech + Non-speech | | | Speech | | |
|---|---|---|---|---|---|---|---|
| | | Internal CC | SWB | CH | Internal CC | SWB | CH |
| Standard ASR (SWB w/o aug.) | 14.2 | 66.7 | 12.1 | 27.5 | 54.0 | 9.5 | 19.7 |
| Standard ASR | 14.2 | 66.1 | 10.6 | 21.1 | 54.9 | 10.0 | 20.4 |
| MTL 3 (SWB + InternalCC-VAD) | 14.2 | 64.8 | 10.2 | 20.6 | 53.4 | 9.8 | 19.6 |
| MTL 4 (SWB + InternalCC-VAD) | 14.2 | 64.0 | 10.2 | 21.7 | 53.7 | 9.7 | 19.7 |
| Standard ASR (SWB w/o aug.) | 4.2 | 76.0 | 20.5 | 34.4 | 63.6 | 13.5 | 29.7 |
| Standard ASR | 4.2 | 73.3 | 15.5 | 29.3 | 65.6 | 13.9 | 33.9 |
| MTL 3 (SWB + InternalCC-VAD) | 4.2 | 71.1 | 15.6 | 27.7 | 63.2 | 13.9 | 31.8 |
| MTL 4 (SWB + InternalCC-VAD) | 4.2 | 70.8 | 15.0 | 28.2 | 62.9 | 13.7 | 31.9 |
| Standard ASR (SWB w/o aug.) | 1.4 | 83.6 | 30.4 | 47.0 | 72.4 | 23.4 | 43.3 |
| Standard ASR | 1.4 | 79.5 | 25.6 | 45.1 | 74.0 | 24.2 | 50.7 |
| MTL 3 (SWB + InternalCC-VAD) | 1.4 | 78.1 | 24.2 | 44.3 | 71.5 | 23.6 | 50.2 |
| MTL 4 (SWB + InternalCC-VAD) | 1.4 | 77.9 | 24.1 | 43.7 | 71.4 | 23.3 | 49.4 |

Detailed IBMCC ASR WER(%) comparison on manually segmented noisy speech + non-speech at different SNR levels (814)

| System | SNR (dB) | InternalCC | | | SWB | CH |
|---|---|---|---|---|---|---|
| | | Monaural recording | Separated Channel A | Separated Channel B | | |
| Standard ASR (SWB w/o aug.) | 14 | 57.0 | 75.3 | 67.7 | 12.1 | 27.5 |
| Standard ASR | | 59.0 | 73.9 | 65.5 | 10.6 | 21.1 |
| MTL 3 (SWB + InternalCC-VAD) | | 59.4 | 71.3 | 63.8 | 10.2 | 20.6 |
| MTL 4 (SWB + InternalCC-VAD) | | 58.4 | 71.3 | 62.3 | 10.2 | 21.7 |
| Standard ASR (SWB w/o aug.) | 4.2 | 68.6 | 83.8 | 75.4 | 20.5 | 34.4 |
| Standard ASR | | 71.9 | 79.1 | 69.0 | 15.5 | 29.3 |
| MTL 3 (SWB + InternalCC-VAD) | | 68.7 | 77.7 | 66.9 | 15.6 | 27.7 |
| MTL 4 (SWB + InternalCC-VAD) | | 69.1 | 77.2 | 66.2 | 15.0 | 28.2 |
| Standard ASR (SWB w/o aug.) | 1.4 | 76.8 | 93.6 | 80.0 | 30.4 | 47.0 |
| Standard ASR | | 77.4 | 87.7 | 73.4 | 25.6 | 45.1 |
| MTL 3 (SWB + InternalCC-VAD) | | 78.8 | 84.3 | 71.4 | 24.2 | 44.3 |
| MTL 4 (SWB + InternalCC-VAD) | | 78.1 | 84.6 | 71.0 | 24.1 | 43.7 |

← 816

ASR WER(%) comparison on noisy audio in an average SNR 4 dB mixed with car noise sounds (SWB/CH) (816)

| System | Non-speech Only | Front Silence | Back Silence | Middle Silence |
|---|---|---|---|---|
| Standard ASR (SWB w/o aug.) | 123.3 / 182.3 | 21.2 / 35.6 | 20.7 / 36.1 | 19.7 / 31.4 |
| Standard ASR | 6.1 / 20.8 | 14.4 / 27.5 | 16.4 / 31.7 | 15.6 / 28.6 |
| MTL 3 (SWB) | 4.7 / 17.6 | 13.7 / 26.5 | 16.1 / 31.7 | 15.2 / 29.5 |
| MTL 4 (SWB) | 7.3 / 18.1 | 13.6 / 27.5 | 15.5 / 31.2 | 15.4 / 28.9 |
| MTL 3 (SWB + InternalCC-VAD) | 6.3 / 17.5 | 14.2 / 26.6 | 16.3 / 28.4 | 16.2 / 28.2 |
| MTL 4 (SWB + InternalCC-VAD) | 4.7 / 20.6 | 13.5 / 26.2 | 15.9 / 30.0 | 15.7 / 28.4 |

FIG. 8D

VOICE ACTIVITY DETECTION INTEGRATION TO IMPROVE AUTOMATIC SPEECH DETECTION

BACKGROUND

One or more embodiments herein relate generally to automatic speech recognition (ASR) systems that are generally deployed together with a voice activity detection (VAD) model to run ASR, and more specifically, to multi-task train a recurrent neural network transducer (RNN-T) that receives ASR information.

SUMMARY

The following presents a summary to provide a basic understanding of one or more embodiments described herein. This summary is not intended to identify key or critical elements, or to delineate any scope of the particular embodiments or any scope of the claims. The sole purpose of the summary is to present concepts in a simplified form as a prelude to the more detailed description that is presented later. In one or more embodiments described herein, devices, systems, computer-implemented methods, apparatus and/or computer program products are described that can facilitate the updating, such as training, of one or more statistical sets.

According to an embodiment, a system can comprise a memory that stores computer executable components and a processor that executes the computer executable components stored in the memory. The computer executable components can include a recurrent neural network transducer (RNN-T) that receives automatic speech recognition information via multitask training. The RNN-T can include an encoder, wherein one or more outputs of the encoder can be integrated with a joint network of the RNN-T. Further, the one or more outputs of the encoder can be integrated with the one or more outputs of a voice activity detection (VAD) model.

According to another embodiment, a computer-implemented method can comprise receiving, by a system operatively coupled to a processor, automatic speech recognition (ASR) information. The computer-implemented method can also comprise multi-task training, by the processor, the RNN-T using the ASR information. The computer-implemented method can integrate, by the processor, an encoder of the RNN-T with a joint network of the RNN-T and/or one or more outputs of a VAD model to improve noise robustness.

According to yet another embodiment, a computer program product for training an RNN-T with a VAD model can comprise a computer readable storage medium having program instructions embodied therewith, the program instructions executable by a processor can cause the processor to receive, by the processor, ASR information. The program product can cause the processor to multi-task train the RNN-T using ASR information and/or integrate an encoder of the RNN-T with a joint network of the RNN-T and one or more outputs of the VAD model.

DESCRIPTION OF THE DRAWINGS

FIG. 7 illustrates a table showing experimentation results for an example, non-limiting computer implemented method that facilitates integrating the VAD information into ASR, in accordance with one or more embodiments described herein.

FIG. 8A illustrates a plurality of tables showing experimentation results for an example, non-limiting computer implemented method that facilitates integrating VAD information into ASR, in accordance with one or more embodiments described herein.

FIG. 8B illustrates a plurality of tables showing experimentation results for an example, non-limiting computer implemented method that facilitates integrating VAD information into ASR, in accordance with one or more embodiments described herein.

FIG. 8C illustrates a plurality of tables showing experimentation results for an example, non-limiting computer implemented method that facilitates integrating VAD information into ASR, in accordance with one or more embodiments described herein.

FIG. 8D illustrates a plurality of tables showing experimentation results for an example, non-limiting computer implemented method that facilitates integrating VAD information into ASR, in accordance with one or more embodiments described herein.

DETAILED DESCRIPTION

Figure 1:
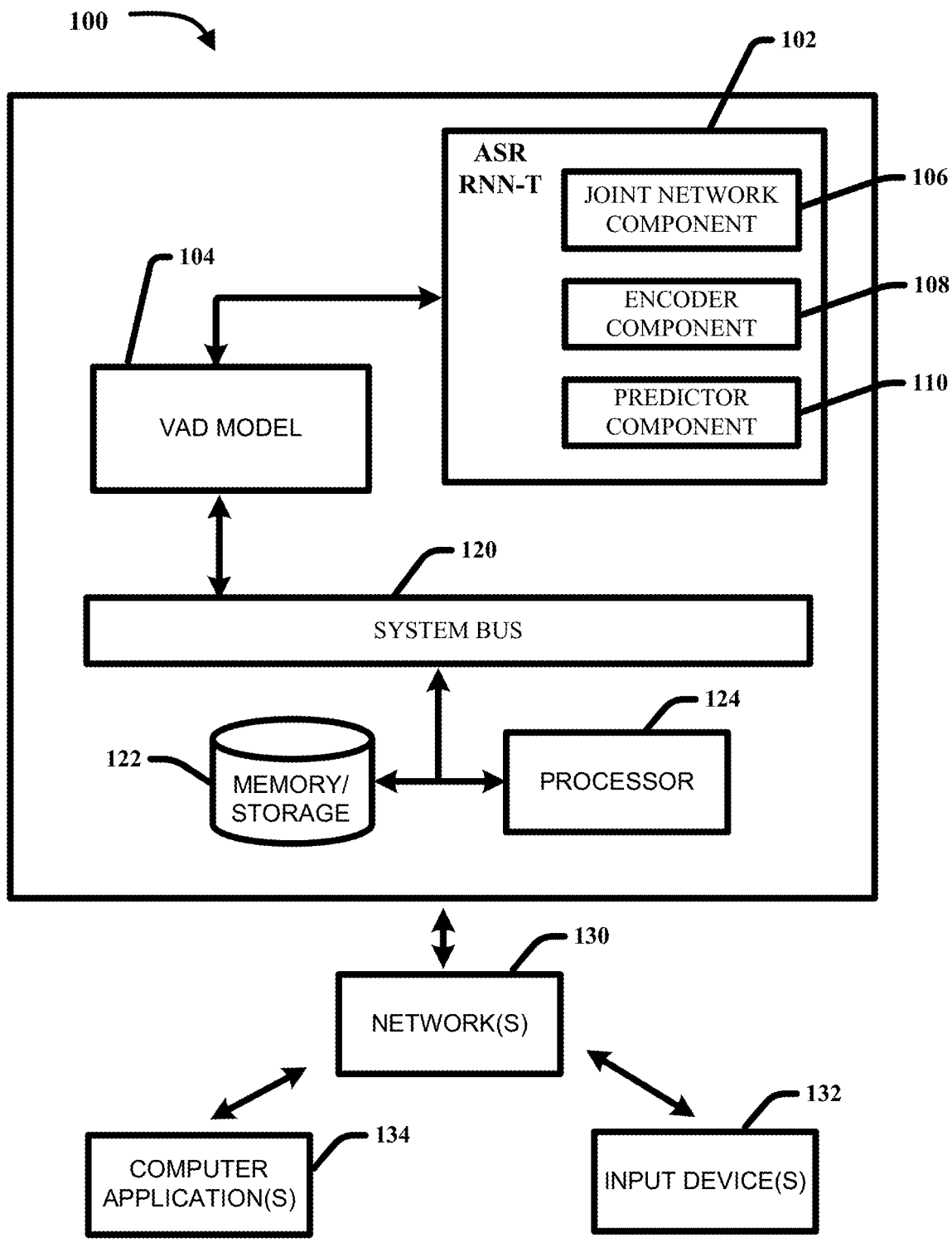
FIG. 1 illustrates a block diagram of an example, non-limiting system that can facilitate integrating the VAD information into ASR, in accordance with one or more embodiments described herein.

The following detailed description is merely illustrative and is not intended to limit embodiments and/or application or uses of embodiments. Furthermore, there is no intention to be bound by any expressed or implied information presented in the preceding Background or Summary sections, or in this Detailed Description section.

With reference to automatic speech recognition (ASR) systems, it will be appreciated that ASR systems can be deployed together with a voice activity detection (VAD) system to run ASR on the voiced acoustic signals. The ASR system can maintain ASR performance by removing unnecessary non-speech parts from input audio signals during inference; however, errors can propagate if the VAD system fails to correctly separate speech from non-speech segments. ASR systems are commonly constructed using segmented speech utterances. Therefore, unexpected errors can occur when VAD-segmented utterances contain a long non-speech part and/or consist of non-speech. The VAD system is more likely to fail in noisy environments and/or in unknown acoustic domains which triggers insertion errors in ASR more prominently.

Further, with reference to ASR systems, it will be appreciated that ASR systems have become widely used in human-machine communication. Recent ASR systems with end-to-end neural network architectures have performed remarkably with less development cost than conventional hybrid ASR systems. Among well-known neural ASR systems, a recurrent neural network transducer (RNN-T) has been widely used due to a lower computational cost than systems designed on other architectures, with a competitive performance, and a capability for online speech recognition. ASR can be paired with a VAD system that extracts actual speech parts from an input audio signal by removing non-speech parts before a decoding process of ASR starts. Recently, neural network-based VAD can be implemented to capture unique properties of speech in various noisy conditions. By combining a multi-task learning approach with feature integration architecture, a system can yield up to 10% relative improvements in very low signal-to-noise ratio (SNR) conditions compared with a system simply trained on mixed data consisting of speech and long non-speech segments.

The VAD model supports a speech recognition process in realistic situations where a speaker utters in various times and places; however, severe recognition errors can occur if the VAD fails to split speech and non-speech segments in input audio. For example, if the VAD system determines a non-speech audio segment as speech, ASR attempts to output a text from an empty speech input. ASR systems are commonly trained with well-segmented speech data (e.g., data can include short silence regions before and/or after actual speech segments, and/or long silence regions can be removed from training data in advance) resulting in speech detection and/or determination errors. Therefore, in noisy conditions where VAD performs inaccurately, ASR accuracy can be deteriorated.

Previous examples of integrating end-to-end ASR and VAD to improve speech segmentation and recognition performance mainly focus on ASR in unsegmented long audio in clean condition. These examples include: a) connectionist temporal classification (CTC)-based ASR with a VAD task where speech can be segmented by assuming blank labels from the CTC soft-max output as speech boundaries; b) multi-task learning framework for ASR and VAD where ASR and VAD share common layers that extract a latent representation from a raw waveform input (e.g., further optimized via ASR and VAD criterion); and/or c) multi-task learning between audio-visual ASR and VAD for noisy speech inputs to leverage visual information.

At least partially addressing these problems, explicitly leveraging VAD information in training RNN-T based ASR can improve robustness of speech recognition in noisy conditions. Improving accuracy of VAD has been a common approach to reduce ASR vulnerability caused by failures of speech segmentation in noisy conditions.

Given these problems, one or more embodiments described herein can be implemented to produce a solution to one or more of these problems in the form of systems, computer-implemented methods, and/or computer program products that can facilitate the following processes: a) receiving, by the processor, automatic speech recognition (ASR) information; b) multi-task training, by the processor, the RNN-T using the ASR information; and/or c) integrating, by the processor, an encoder of the RNN-T with a joint network of the RNN-T and one or more outputs of a VAD model to improve robustness of speech recognition in noisy conditions. That is, embodiments described herein include one or more systems, computer-implemented methods, apparatuses and/or computer program products that can facilitate one or more of the aforementioned processes.

Further, improving accuracy of VAD has been a common approach to improving robustness of ASR. However, one or more embodiments described herein improves ASR robustness to VAD errors. That is, embodiments described herein include one or more systems, computer-implemented methods, apparatuses, and/or computer program products that can integrate the VAD information into ASR via feature-level integration and/or multi-task learning.

Previously, multi-task learning in RNN-T has been proposed with keyword-spotting and language modeling as a sub-task for rare word recognition. To improve noisy ASR performance, multi-task learning jointly minimizes ASR RNN-T loss and VAD errors when frame-level speech/non-speech labels generated by convolutional neural network (CNN) based VAD system using spectro-temporal are predicted.

Additionally, un-transcribed audio data in a multi-task learning framework can be utilized as auxiliary training data for the VAD component, via knowledge distillation approaches. Normally, preparing transcribed data for ASR training that covers a vast domain of speech is very expensive; therefore, amount of training data for ASR is often limited. Further, in embodiments, VAD systems trained using data of diverse environmental domains can perform well in various acoustic conditions. A VAD model contains information representing surrounding acoustic environments that can be useful for improving robustness of the ASR model (e.g., information representing surrounding acoustic environments to distinguish speech from non-speech). In one or more embodiments described herein, a system can distill abundant acoustic environmental knowledge contained in well-trained VAD models into ASR networks without using additional transcribed data for improving ASR robustness, e.g., experimental results with English telephone conversations with long silence portions indicate that by using the auxiliary VAD training data, the system improved the ASR noise robustness in new acoustic domains.

One or more embodiments are now described with reference to the drawings, where like referenced numerals are used to refer to like elements throughout. In the following description, for purposes of explanation, numerous specific details are set forth in order to provide a more thorough understanding of the one or more embodiments. It is evident in various cases, however, that the one or more embodiments can be practiced without these specific details.

FIG. 1 illustrates a block diagram of an example, non-limiting system 100 that comprises an RNN-T including a joint network component 106, an encoder component 108, and/or a predictor component 110. The VAD integrated system 100 can integrate the encoder component 108 of the RNN-T 102 (e.g., ASR RNN-T) with a joint network 106 of the RNN-T 102 and one or more outputs of a VAD model 104 to improve robustness to noise. Repetitive description of like elements employed in other embodiments described herein is omitted for sake of brevity. Aspects of systems (e.g., the VAD integrated system 100 and the like), apparatuses or processes in various embodiments of the present invention can constitute one or more machine-executable components embodied within one or more machines (e.g., embodied in one or more computer readable mediums (or media) associated with one or more machines). Such components, when executed by the one or more machines (e.g., computers, computing devices, virtual machines, a combination thereof, and/or the like) can cause the machines to perform the operations described.

Figure 10:
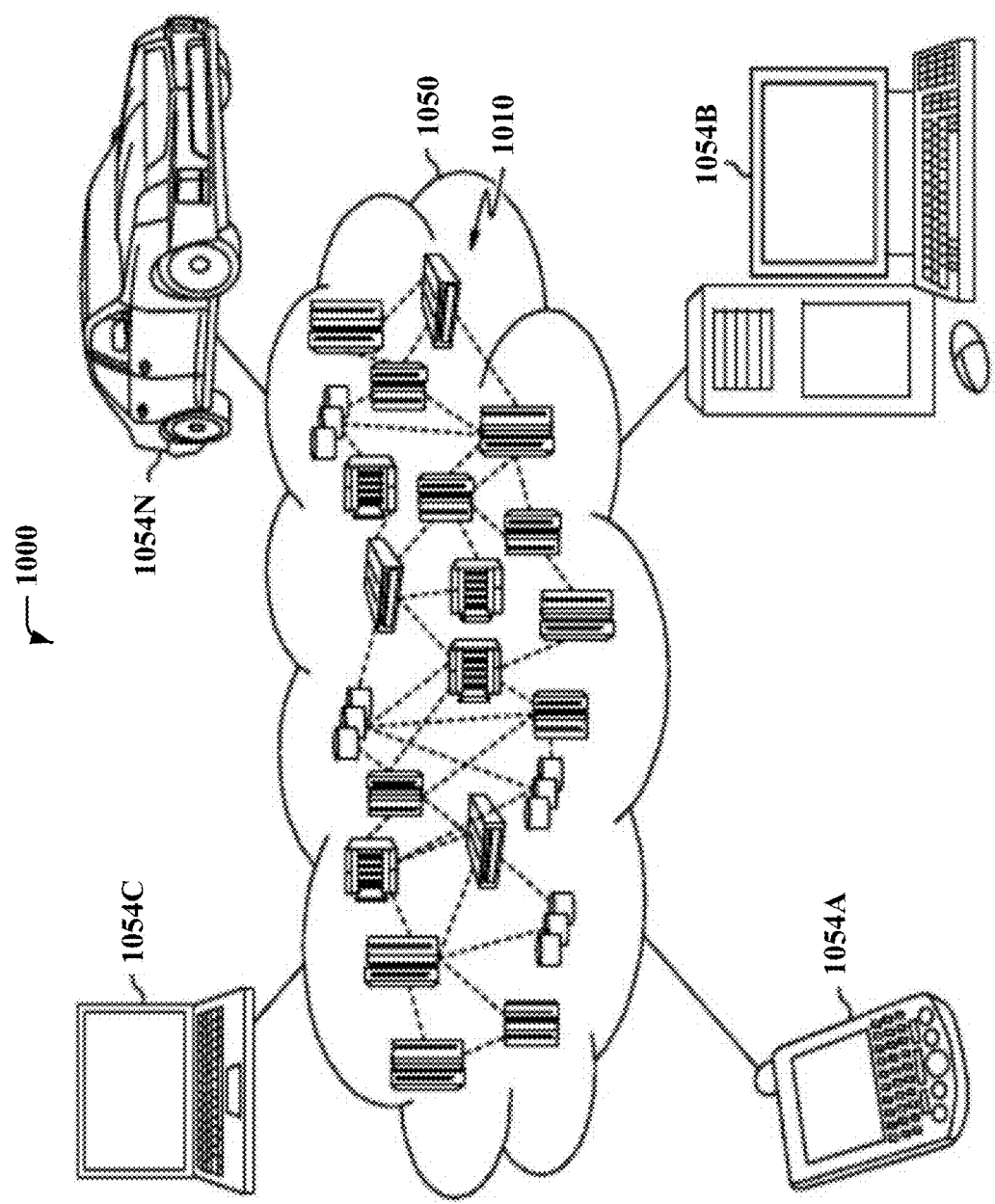
FIG. 10 illustrates a block diagram of an example, non-limiting cloud computing environment in accordance with one or more embodiments described herein.

Turning now in particular to one or more figures, and first to FIG. 1, the figure illustrates a block diagram of an example, non-limiting system 100 that facilitates receiving, by a processor 124, automatic speech recognition (ASR) information in accordance with one or more embodiments described herein. The VAD integrated system 100 can comprise a recurrent neural network transducer (RNN-T) 102 and/or a voice activity detection (VAD) model 104, which can be associated with a cloud computing environment 1000 (FIG. 10). For example and without limitation, the RNN-T 102 can be an RNN-T 102 configured for automatic speech recognition. The RNN-T can further comprise the predictor component 110 connected with the joint network component 106 (e.g., the joint network). The VAD integrated system 100 can be comprised by one or more RNN-T 102, one or more VAD model 104, one or more networks 130, one or more input devices 132, and/or one or more computer applications 134. The RNN-T 102 and/or the VAD model 104 can be connected with one or more machines comprised by the VAD integrated system 100. As used herein, the one or more machines can include one or more of a computing device, a general-purpose computer, a special-purpose computer, a quantum computing device (e.g., a quantum computer), a tablet computing device, a handheld device, a server class computing machine and/or database, a laptop computer, a notebook computer, a desktop computer, a cell phone, a smart phone, a consumer appliance and/or instrumentation, an industrial and/or commercial device, a digital assistant, a multimedia Internet enabled phone and/or another type of device.

In some examples, the VAD integrated system 100 can be associated with a cloud computing environment 1000 described below with reference to FIG. 10 and/or with one or more functional abstraction layers described below with reference to FIG. 11 (e.g., hardware and software layer 1160, virtualization layer 1170, management layer 1180 and/or workloads layer 1190).

The VAD integrated system 100 and/or components thereof (e.g., the RNN-T 102 and/or the VAD model 104) can employ one or more computing resources of the cloud computing environment described below with reference to FIG. 10, and/or with reference to the one or more functional abstraction layers (e.g., quantum software and/or the like) described below with reference to FIG. 11, to execute one or more operations in accordance with one or more embodiments described herein. For example, cloud computing environment and/or one or more of the functional abstraction layers 1160, 1170, 1180, and/or 1190 can comprise one or more classical computing devices (e.g., classical computer, classical processor, virtual machine, server and/or the like), quantum hardware and/or quantum software (e.g., quantum computing device, quantum computer, quantum processor, quantum circuit simulation software, superconducting circuit and/or the like) that can be employed by the system and/or components thereof to execute one or more operations in accordance with one or more embodiments described herein. For instance, the system and/or components thereof can employ one or more classical and/or quantum computing resources to execute one or more classical and/or quantum: mathematical functions, calculations and/or equations; computing and/or processing scripts; algorithms; models (e.g., artificial intelligence (AI) models, machine learning (ML) models and/or like model); and/or another operation in accordance with one or more embodiments described herein.

It is to be understood that although one or more embodiments described herein include a detailed description on cloud computing, implementation of the teachings recited herein are not limited to a cloud computing environment. Rather, one or more embodiments described herein are capable of being implemented in conjunction with any other type of computing environment now known or later developed.

Cloud computing is a model of service delivery for enabling convenient, on-demand network access to a shared pool of configurable computing resources (e.g., networks, network bandwidth, servers, processing, memory, storage, applications, virtual machines and services) that can be rapidly provisioned and released with minimal management effort or interaction with a provider of the service. This cloud model can include at least five characteristics, at least three service models, and at least four deployment models.

Characteristics are as Follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but can be able to specify location at a higher level of abstraction (e.g., country, state or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth and active user accounts). Resource usage can be monitored, controlled and reported, providing transparency for both the provider and consumer of the utilized service.

Service Models are as Follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage or individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems or storage, but has control over the deployed applications and possibly application hosting environment configurations.

Infrastructure as a Service (IaaS): the capability provided to the consumer is to provision processing, storage, networks and/or other fundamental computing resources where the consumer can deploy and run arbitrary software, which can include operating systems and applications. The consumer does not manage or control the underlying cloud infrastructure but has control over operating systems, storage, deployed applications and/or possibly limited control of select networking components (e.g., host firewalls).

Deployment Models are as Follows:

Private cloud: the cloud infrastructure is operated solely for an organization. It can be managed by the organization or a third party and can exist on-premises or off-premises.

Community cloud: the cloud infrastructure is shared by several organizations and supports a specific community that has shared concerns (e.g., mission, security requirements, policy and/or compliance considerations). It can be managed by the organizations or a third party and can exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community or public) that remain unique entities but are bound together by standardized or proprietary technology that enables data and application portability (e.g., cloud bursting for load-balancing among clouds).

A cloud computing environment is service oriented with a focus on statelessness, low coupling, modularity and/or semantic interoperability. At the heart of cloud computing is an infrastructure that includes a network of interconnected nodes.

Moreover, the VAD integrated system 100 can be associated with or be included in a data analytics system, a data processing system, a graph analytics system, a graph processing system, a big data system, a social network system, a speech recognition system, an image recognition system, a graphical modeling system, a bioinformatics system, a data compression system, an artificial intelligence system, an authentication system, a syntactic pattern recognition system, a medical system, a health monitoring system, a network system, a computer network system, a communication system, a router system, a server system, a high availability server system (e.g., a Telecom server system), a Web server system, a file server system, a data server system, a disk array system, a powered insertion board system, a cloud-based system or the like. In accordance therewith, the VAD integrated system 100 can be employed to use hardware and/or software to solve problems that are highly technical in nature, that are not abstract and/or that cannot be performed as a set of mental acts by a human.

Turning now to aspects of the VAD integrated system 100, the system 100 can comprise one or more RNN-T 102, one or more VAD model 104, one or more system bus 120, one or more memory/storage component 122, one or more processor 124, one or more networks 130, one or more input devices 132, and/or one or more computer applications 134.

It should be appreciated that the embodiments depicted in various figures disclosed herein are for illustration only, and as such, the architecture of embodiments is not limited to the systems, devices and/or components depicted therein, nor to any particular order, connection and/or coupling of systems, devices and/or components depicted therein. For example, in some embodiments, the VAD integrated system 100 can further comprise various computer and/or computing-based elements described herein with reference to operating environment 900 and FIG. 9. In several embodiments, computer and/or computing-based elements can be used in connection with implementing one or more of the systems, devices, components and/or computer-implemented operations shown and described in connection with FIG. 1 or with other figures disclosed herein.

Memory 122 can store one or more computer and/or machine readable, writable and/or executable components and/or instructions that, when executed by processor 124 (e.g., a classical processor, a quantum processor and/or like processor), can facilitate performance of operations defined by the executable component(s) and/or instruction(s). For example, memory 122 can store computer and/or machine readable, writable and/or executable components and/or instructions that, when executed by processor 124, can facilitate execution of the various functions described herein relating to the RNN-T 102, the VAD model 104, and/or another component associated with the VAD integrated system 100 as described herein with or without reference to the various figures of the one or more embodiments.

Memory 122 can comprise volatile memory (e.g., random access memory (RAM), static RAM (SRAM), dynamic RAM (DRAM) and/or the like) and/or non-volatile memory (e.g., read only memory (ROM), programmable ROM (PROM), electrically programmable ROM (EPROM), electrically erasable programmable ROM (EEPROM) and/or the like) that can employ one or more memory architectures. Further examples of memory 122 are described below with reference to system memory 906 and FIG. 9. These examples of memory 122 can be employed to implement any one or more embodiments described herein.

Processor 124 can comprise one or more types of processors and/or electronic circuitry (e.g., a classical processor, a quantum processor and/or like processor) that can implement one or more computer and/or machine readable, writable and/or executable components and/or instructions that can be stored at memory 122. For example, processor 124 can perform various operations that can be specified by computer and/or machine readable, writable and/or executable components and/or instructions including, but not limited to, logic, control, input/output (I/O), arithmetic and/or the like. In some embodiments, processor 124 can comprise one or more central processing unit, multi-core processor, microprocessor, dual microprocessors, microcontroller, System on a Chip (SOC), array processor, vector processor, quantum processor and/or another type of processor. Additional examples of processor 124 are described below with reference to processing unit 904 and FIG. 9. The examples of processor 124 can be employed to implement any one or more embodiments described herein.

The VAD integrated system 100, the RNN-T 102, the VAD model 104, the joint network component 106, the encoder component 108, the predictor component 110, the processor 124, and/or another component of system 100 the memory 122 as described herein can be communicatively, electrically, operatively and/or optically coupled to one another via a bus 120 to perform functions of system 100 and/or any components coupled therewith. Bus 120 can comprise one or more memory bus, memory controller, peripheral bus, external bus, local bus, a quantum bus and/or another type of bus that can employ various bus architectures. Further examples of bus 120 are described below with reference to system bus 908 and FIG. 9. The examples of bus 120 can be employed to implement any one or more embodiments described herein.

The VAD integrated system 100 can comprise any type of component, machine, device, facility, apparatus and/or instrument that comprises a processor and/or can be capable of effective and/or operative communication with a wired and/or wireless network. All suitable such embodiments are envisioned. For example, the VAD integrated system 100 can comprise a server device, a computing device, a general-purpose computer, a special-purpose computer, a quantum computing device (e.g., a quantum computer), a tablet computing device, a handheld device, a server class computing machine and/or database, a laptop computer, a notebook computer, a desktop computer, a cell phone, a smart phone, a consumer appliance and/or instrumentation, an industrial and/or commercial device, a digital assistant, a multimedia Internet enabled phone, a multimedia players and/or another type of device.

The VAD integrated system 100 can be coupled (e.g., communicatively, electrically, operatively, optically and/or the like) to one or more external systems, sources and/or devices (e.g., classical and/or quantum computing devices, communication devices and/or the like) via a data cable (e.g., High-Definition Multimedia Interface (HDMI), recommended standard (RS) 232, Ethernet cable and/or the like). In some embodiments, the VAD integrated system 100 can be coupled (e.g., communicatively, electrically, operatively, optically and/or the like) to one or more external systems, sources and/or devices (e.g., classical and/or quantum computing devices, communication devices and/or the like) via a network.

In some embodiments, a network can comprise one or more wired and/or wireless networks, including, but not limited to, a cellular network, a wide area network (WAN) (e.g., the Internet), or a local area network (LAN). For example, the VAD integrated system 100, the RNN-T 102, and/or the VAD model 104 can communicate with one or more external systems, sources and/or devices, for instance, computing devices (and vice versa) using virtually any desired wired or wireless technology, including but not limited to: wireless fidelity (Wi-Fi), global system for mobile communications (GSM), universal mobile telecommunications system (UMTS), worldwide interoperability for microwave access (WiMAX), enhanced general packet radio service (enhanced GPRS), third generation partnership project (3GPP) long term evolution (LTE), third generation partnership project 2 (3GPP2) ultra-mobile broadband (UMB), high speed packet access (HSPA), Zigbee and other 802.XX wireless technologies and/or legacy telecommunication technologies, BLUETOOTH®, Session Initiation Protocol (SIP), ZIGBEE®, RF4CE protocol, WirelessHART protocol, 6LoWPAN (IPv6 over Low power Wireless Area Networks), Z-Wave, an ANT, an ultra-wideband (UWB) standard protocol and/or other proprietary and/or non-proprietary communication protocols. In a related example, the VAD integrated system 100 can include hardware (e.g., a central processing unit (CPU), a transceiver, a decoder, quantum hardware, a quantum processor and/or the like), software (e.g., a set of threads, a set of processes, software in execution, quantum pulse schedule, quantum circuit, quantum gates and/or the like) and/or a combination of hardware and software that facilitates communicating information among the VAD integrated system 100 and external systems, sources and/or devices (e.g., computing devices, communication devices and/or the like).

The VAD integrated system 100 can comprise one or more computer and/or machine readable, writable and/or executable components and/or instructions that, when executed by processor 124 (e.g., a classical processor, a quantum processor and/or the like), can facilitate performance of one or more operations defined by such component(s) and/or instruction(s). Further, in numerous embodiments, any component associated with VAD integrated system 100, as described herein with or without reference to the various figures of the one or more embodiments, can comprise one or more computer and/or machine readable, writable and/or executable components and/or instructions that, when executed by processor 124, can facilitate performance of one or more operations defined by such component(s) and/or instruction(s). For example, the joint network component 106 (e.g., a connection to a joint network and/or a network connection layer of the RNN-T), the encoder component 108 (e.g., connection to an encoder network and/or an encoder connection layer of the RNN-T), the predictor component 110 (e.g., connection to a predictor network and/or a predictor layer of the RNN-T), and/or any other components associated with the VAD integrated system 100 as disclosed herein (e.g., communicatively, electronically, operatively and/or optically coupled with and/or employed by system 100), can comprise such computer and/or machine readable, writable and/or executable component(s) and/or instruction(s). Consequently, according to numerous embodiments, the VAD integrated system 100 and/or any components associated therewith as disclosed herein, can employ processor 124 to execute such computer and/or machine readable, writable and/or executable component(s) and/or instruction(s) to facilitate performance of one or more operations described herein with reference to system 100 and/or any such components associated therewith.

The VAD integrated system 100 can facilitate (e.g., via processor 124) performance of operations executed by and/or associated with the RNN-T 102, the VAD model 104, the joint network component 106, the encoder component 108, the predictor component 110, and/or another component associated with system 100 as disclosed herein. For instance, as described in detail below, the VAD integrated system 100 can facilitate via processor 124 (e.g., a classical processor, a quantum processor and/or the like): receiving automatic speech recognition (ASR) information; multi-task training the RNN-T 102 using the ASR information; and/or integrating the encoder component 108 of the RNN-T 102 with a joint network component 106 of the RNN-T 102 and/or one or more outputs of the VAD model 104 to improve robustness to noise. As will be apparent from the below, one or more systems can be employed to transfer VAD-based knowledge to the RNN-T 102. For example and without limitation, the VAD integrated system 100 can be employed to improve robustness to noise via feature integration and/or multi-task training.

Turning now to additional aspects illustrated at FIG. 1, such as the components of the VAD integrated system 100 as illustrated in FIG. 1, further functionality of the system will be described. Additional description of functionalities will be further described below with reference to the example embodiments of FIGS. 2A, 2B, and 3A-3D, where repetitive description of like elements and/or processes employed in respective embodiments is omitted for sake of brevity.

Figure 2A:
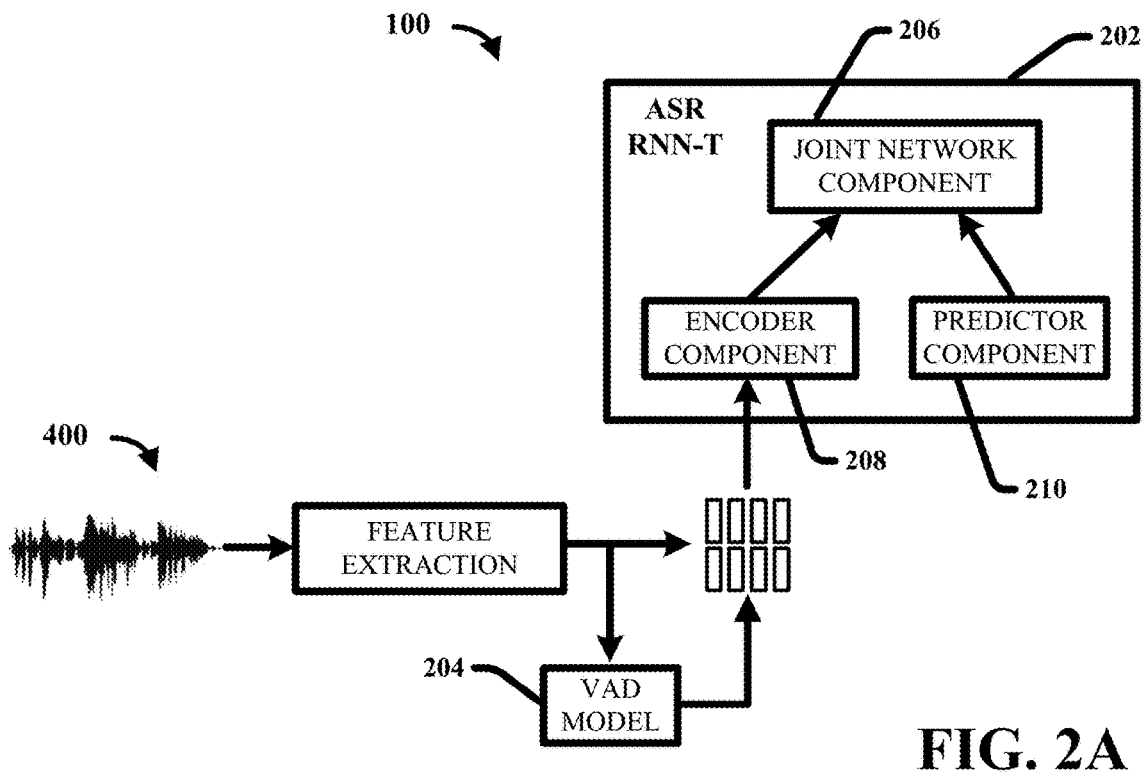
FIG. 2A illustrates a block diagram of an example, non-limiting system that can facilitate integrating the VAD information into ASR, in accordance with one or more embodiments described herein.
Figure 2B:
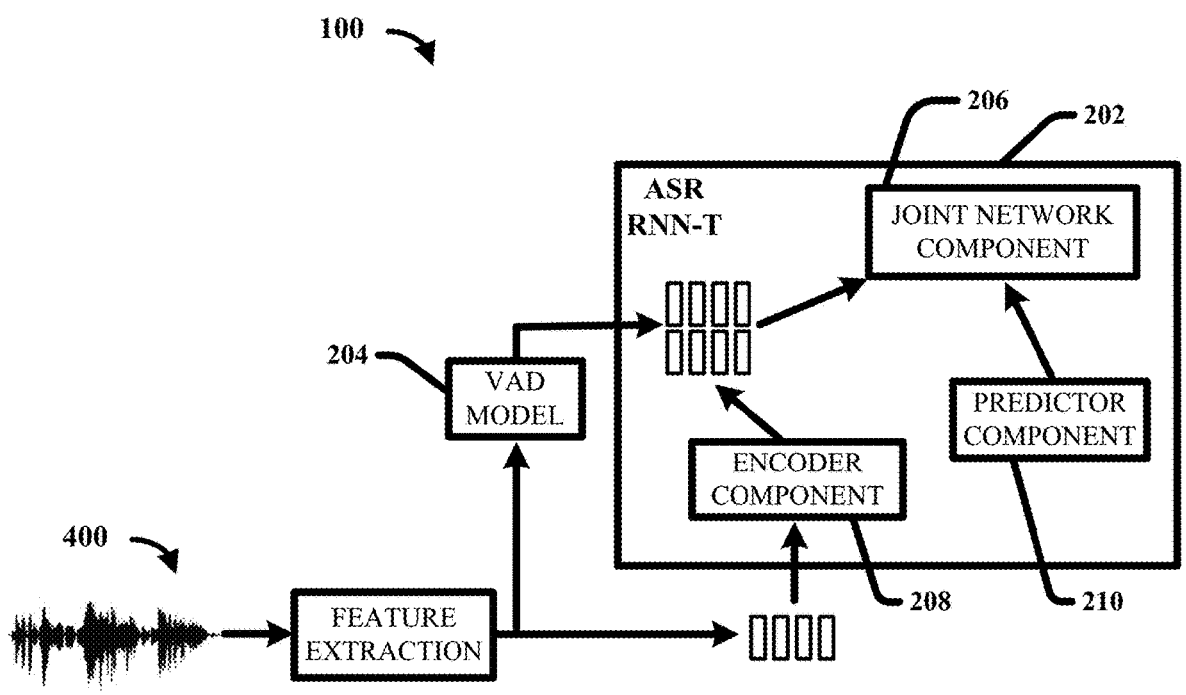
FIG. 2B illustrates a block diagram of another example, non-limiting system that can facilitate integrating the VAD information into ASR, in accordance with one or more embodiments described herein.
Figure 4:
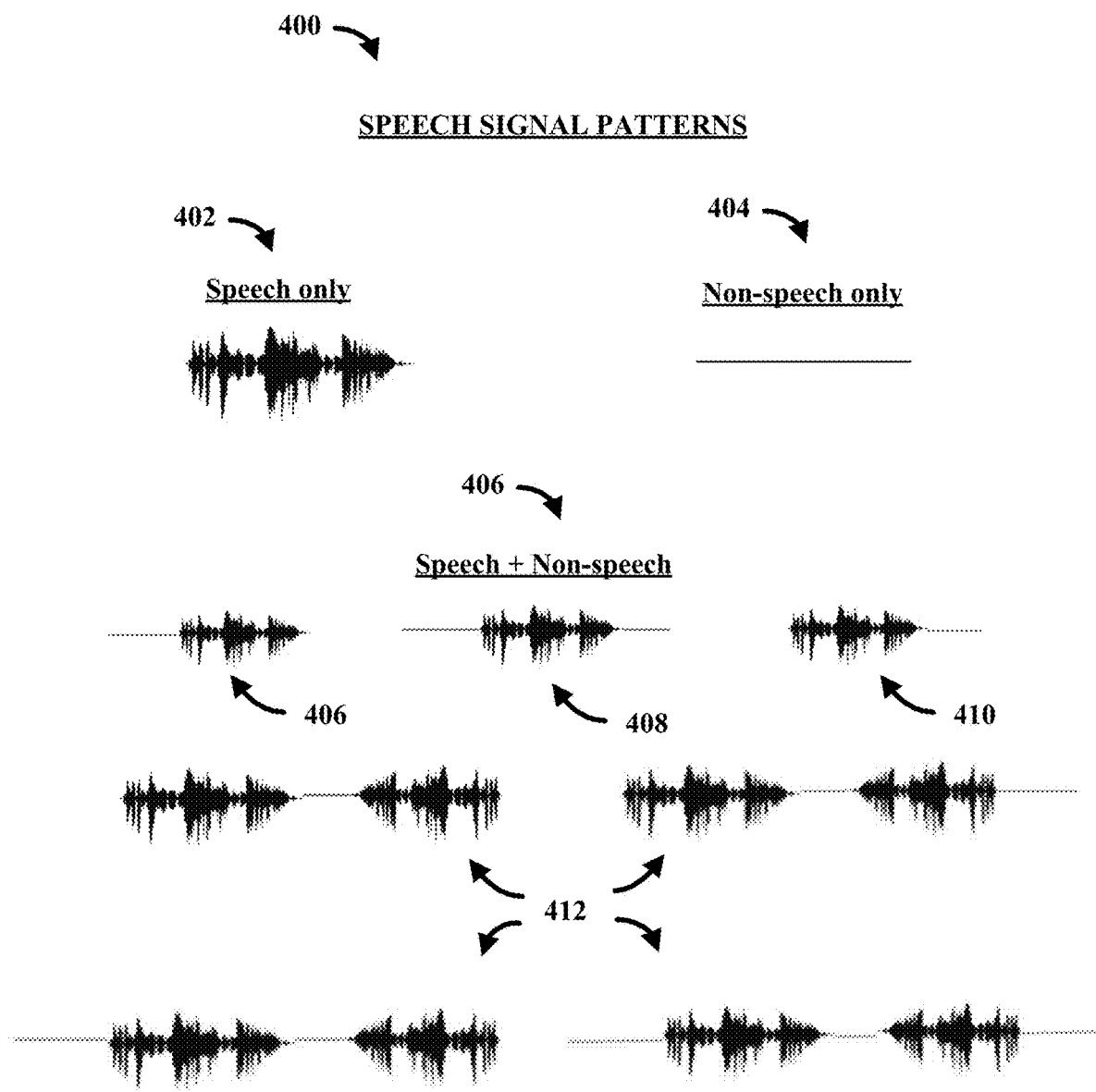
FIG. 4 illustrates a variety of speech signal patterns for an example, non-limiting system as input for the RNN-T and/or VAD model, in accordance with one or more embodiments described herein.

In embodiments, such as generally illustrated in FIGS. 2A and 2B, the VAD integrated system 100 can include feature integration (e.g., feature extraction) of the speech frame input sequence 400 (see, e.g., FIG. 4). The VAD integrated system 100 can include feature integration in one or more of a variety of connection manners/orientations. The VAD integrated system 100 can include the VAD model 204 integrated at a pre-encoder position (see, e.g., FIG. 2A) and/or a post-encoder position (see, e.g., FIG. 2B). Further, the RNN-T 202 can include a joint network component 206 (e.g., a connection to a joint network), an encoder component 208 (e.g., a connection to an encoder network), and/or a predictor component 210 (e.g., a connection to a predictor network). Given a speech feature input sequence of sequence $x=(x_1, \ldots, x_T)$ of length T, RNN-T 202 outputs the text token sequence $y=(y_1, \ldots, y_U)$ of length U by modeling the conditional distribution $p(y|x)$ of input and output. In embodiments, feature integration can occur by concatenating voice activity class probabilities generated from separately trained VAD model with ASR features. The VAD model 204 can predict the sequence of voice activity class $v=(v_1, \ldots, v_T)$ of length T from a speech frame sequence x with the same length. The VAD integration system 100 can concatenate features between the VAD output probability $p(v|x)$ and the ASR feature of the corresponding speech frame.

Figure 3A:
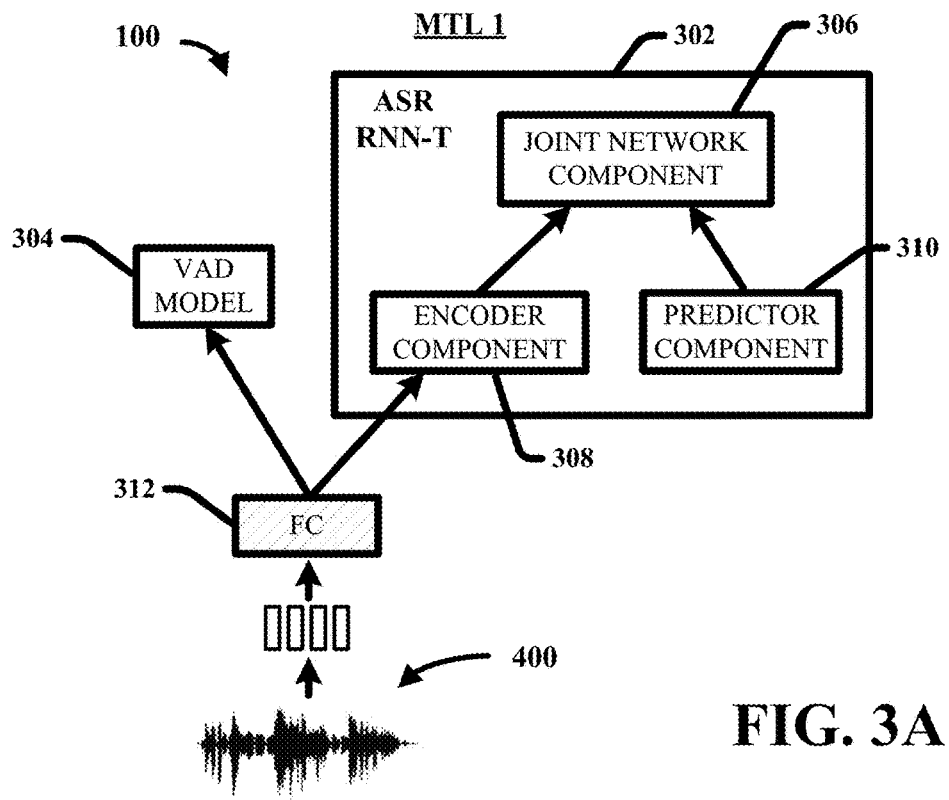
FIG. 3A illustrates a block diagram of another example, non-limiting system that can facilitate integrating the VAD information into ASR, in accordance with one or more embodiments described herein.
Figure 3B:
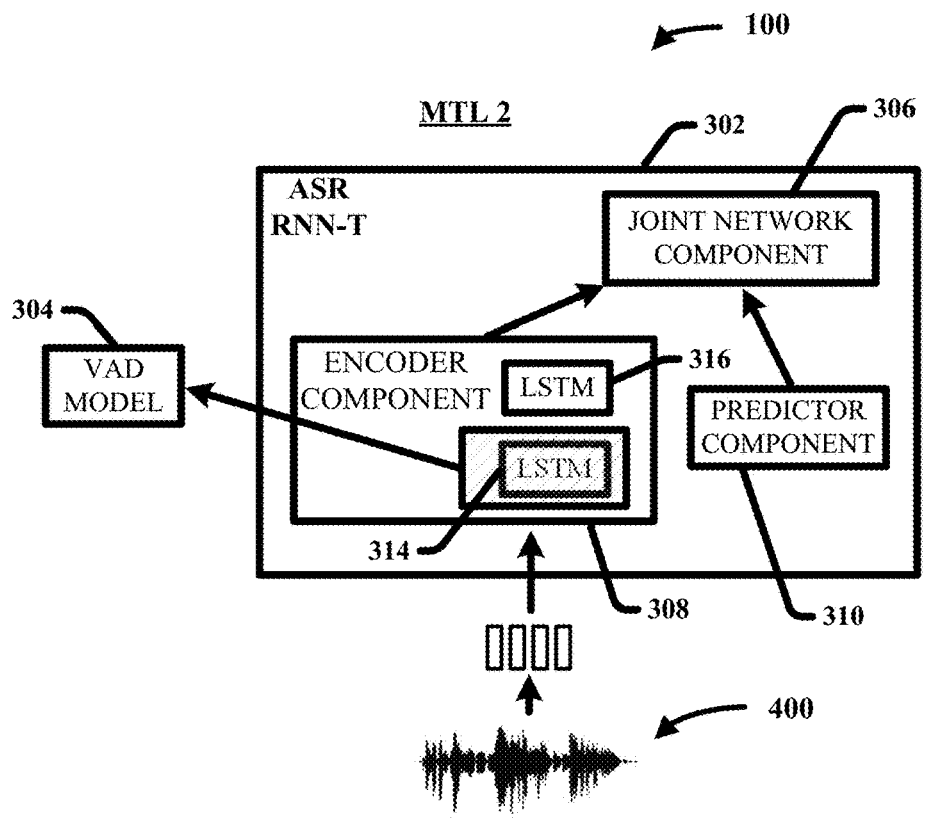
FIG. 3B illustrates a block diagram of another example, non-limiting system that can facilitate integrating the VAD information into ASR, in accordance with one or more embodiments described herein.
Figure 3C:
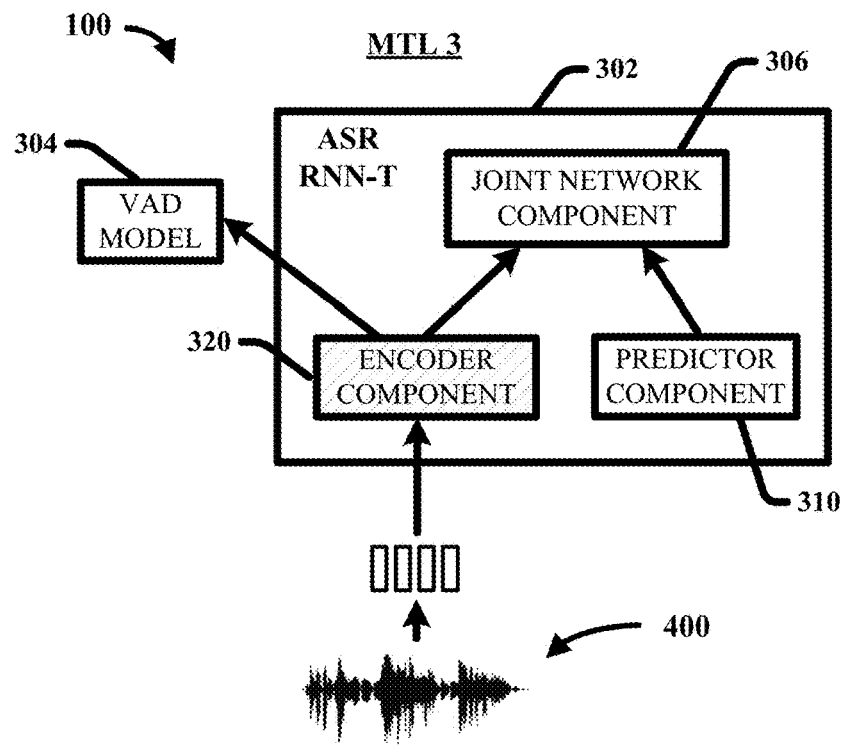
FIG. 3C illustrates a block diagram of another example, non-limiting system that can facilitate integrating the VAD information into ASR, in accordance with one or more embodiments described herein.

As illustrated in FIG. 2A, the system can include single-task ASR with VAD feature integration through concatenation at a pre-encoder position. For example and without limitation, the VAD model 204 can be connected before the encoder component 208 and can therefore feed into the encoder component 208. The VAD integrated system 100 can concatenate VAD output probability $p(v|x)$ with the input feature for RNN-T x before the encoder component 208 as represented by Eq. 1, below, where $x_c$ is the encoder input feature after concatenation.

$$x_c = ((x_1, p(v_1|x)), \ldots, (x_T, p(v_T|x)))$$ Eq. 1:

As illustrated in FIG. 2B, the VAD integrated system 100 can include single-task ASR with VAD feature integration through concatenation at a post-encoder position. For example and without limitation, the VAD model 204 can be connected after the encoder component 208, such that VAD information from the VAD model 204 and the output of the encoder component 208 can be concatenated and transmitted to the joint network 206. Feature-level integration can occur between the VAD output probability $p(v|x)$ and the RNN-T encoder output $h=(h_1, \ldots, h_T)$ as represented by Equations 2 and 3, below, where $h_c$ is the integrated features that will be passed to the joint network.

$$h = \text{Encoder}(x)$$ Eq. 2:

$$h_c = ((h_1, p(v_1|x)), \ldots, (h_T, p(v_T|x)))$$ Eq. 3:

Turning now to aspects of the system as illustrated by FIGS. 3A, 3B, 3C, and/or 3D, the VAD integrated system 100 can multi-task train the RNN-T 302 and/or the VAD model 304 to improve ASR robustness. In embodiments as described generally herein, the VAD integrated system 100 can train the RNN-T 302 by ASR information (e.g., ASR criteria) as the main task, and/or the system 100 can train the VAD model 304 as the sub-task. For example and without limitation, the VAD integration system 100 can train the RNN-T 302 and the VAD model 304 contemporaneously and/or alternatively. Further, in one or more of a variety of embodiments (e.g., FIGS. 3A, 3B, 3C, and 3D) encoder layers of the RNN-T for ASR processing can be shared with encoder layers for VAD processing (e.g., as a sub-task).

In some embodiments, such as generally illustrated in FIG. 3A, the VAD integrated system 100 can include pre-encoder sharing architecture (e.g., MTL 1) for effectuating multi-task training. Thus, an additional network can be appended to the RNN-T 302 before the encoder component 308 for operations and/or processes to occur at the encoder component 308. The RNN-T 302 includes a joint network component 306, an encoder component 308, and/or a predictor component 310. The VAD integrated system 100 can produce an input representative of ASR information and the VAD model 304 to be passed to the encoder component 308. In embodiments, the VAD integrated system 100 includes a shared network consisting of a stack of fully connected neural network 312 (e.g., FC) layers with the hyperbolic tangent function. The VAD model 304 can operate as a sub-task and/or the VAD model 304 can consist of a convolutional neural network (CNN).

Further, in other embodiments, such as generally illustrated in FIG. 3B, the VAD integrated system 100 can include partial encoder sharing architecture (e.g., MTL 2) for effectuating multi-task training. Thus, the RNN-T 302 (e.g., ASR RNN-T) and the VAD model 304 share at least a part of the RNN-T 302 from a bottom layer (e.g., a physical connection layer of the VAD integrated system 100 whereby the VAD model 304 and the RNN-T 302 can be physically connected to the encoder component 308 of the RNN-T 302, and/or can utilize the processes employed by the encoder component 308 for both ASR RNN-T 302 functions and the VAD model 304 functions). The RNN-T 302 can include the joint network component 306, the encoder component 308, and/or the predictor component 310 (e.g., the encoder layer of the RNN-T shared with the VAD model 304). The VAD model 304 (e.g., VAD branch) is followed by a stack of fully connected layers that predict VAD classes of the input (e.g., the speech fame input sequence). The encoder component 308 can include one or more long-short term memory (LSTM) components/processors 314, 316 to effectuate multi-task processing the RNN-T 302 and the VAD model 304.

In some embodiments, such as generally illustrated in FIG. 3C, the VAD integrated system 100 can include full encoder sharing architecture (e.g., MTL 3) for effectuating multi-task learning. Thus, ASR and the VAD model 304 can use all encoder layers in the RNN-T 302 as the shared network. The RNN-T 302 can include a joint network component 306, a predictor component 310, and/or an encoder component 320 (e.g., which can be fully shared with the VAD model for multi-task learning).

Figure 3D:
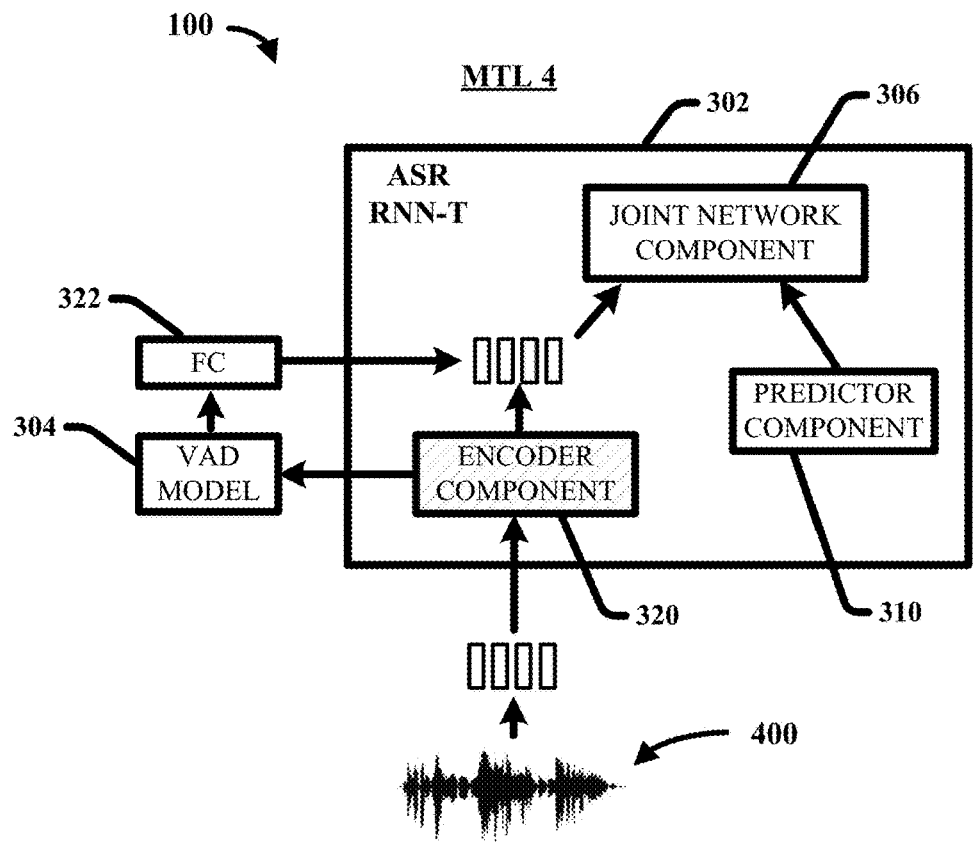
FIG. 3D illustrates a block diagram of another example, non-limiting system that can facilitate integrating the VAD information into ASR, in accordance with one or more embodiments described herein.

Further, in other embodiments, such as generally illustrated in FIG. 3D, the VAD integrated system 100 can include full encoder sharing with feature integration architecture (e.g., MTL 4) for effectuating multi-task training. Thus, VAD soft outputs can be projected into a vector with the same dimension as the RNN-T encoder output using a fully connected layer 322 (e.g., connected with the VAD model 304 exterior to the RNN-T 302. According to the embodiment of FIG. 3D, the entire network (e.g., the VAD integrated system 100) can be trained using encoder component 320 layers as the shared layers for the VAD model 304 and the RNN-T 302. The system can merge the VAD soft outputs with the RNN-T encoder output via an elementwise summation operation.

It will be appreciated that the VAD integrated system 100 can be trained using auxiliary VAD data independent and/or in combination with the system architecture of FIGS. 1-3D. In embodiments, the VAD integrated system 100 can utilize auxiliary un-transcribed audio-only data (e.g., auxiliary VAD data) for an optimization of the network related to the VAD task to improve ASR performance. Auxiliary VAD data can be utilized by the VAD integrated system 100 via one or more training acts/procedures.

Looking first to a non-component aspect, the VAD integrated system 100 has a speech frame input sequence 400 associated therewith (e.g., an audio input signal and/or stream). The speech frame input sequence 400 can include one or more of a variety of speech signal patterns, such as generally illustrated in FIG. 4. For example and without limitation, the speech frame input sequence 400 can include: speech only segments 402, non-speech only segments 404, and/or one or more of a variety of speech and non-speech segments 406. The speech frame input sequence 400 received by the VAD model 104 can include short non-speech segments on both ends of the input audio (e.g., 408). Under typical noisy conditions, the VAD model 104 can be prone to produce prediction errors of the actual speech segments of the speech frame input sequence. Further, to improve noise robustness of the system, VAD information can be incorporated in an RNN-T 102 based ASR training VAD information can be integrated into ASR through feature-level integration and/or multi-task learning.

In embodiments, the VAD integrated system 100 can train ASR and the VAD model 104 proactively using both speech and non-speech segments. For example and without limitation, speech only training data can be augmented by artificially adding non-speech segments before and/or after each side of the speech segment. The VAD integrated system 100 can utilize not only the augmented training data, but also speech-only segments 402 and non-speech only segments 404 (e.g., whitespace). Further, the VAD integrated system 100 can process speech+non-speech in one or more of a variety of contexts. For example and without limitation, the VAD integrated system 100 can process front silence 406, dual-side silence 408, back silence 410, and/or middle silence 412 on the speech frame input sequence 400.

Figure 5A:
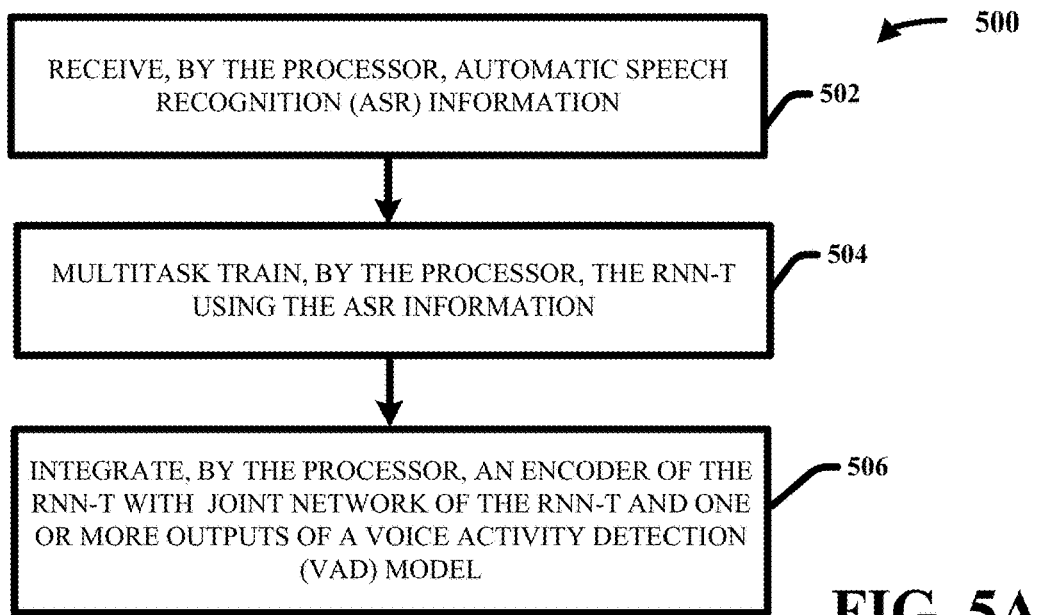
FIG. 5A illustrates a flow diagram of an example, non-limiting systems that can facilitate integrating the VAD information with the RNN-T, in accordance with one or more embodiments described herein.
Figure 5B:
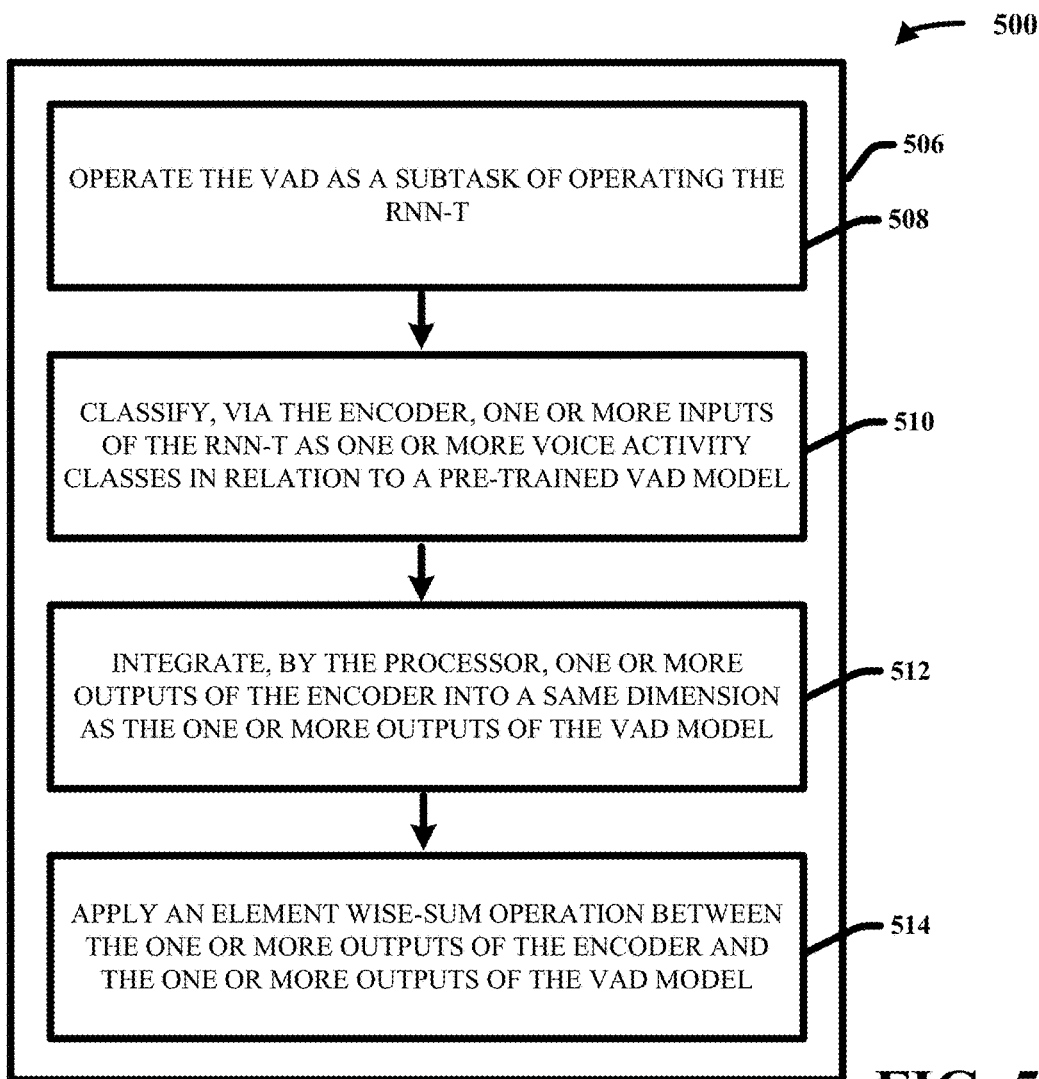
FIG. 5B illustrates a flow diagram of an example, non-limiting systems that can facilitate integrating the VAD information with the RNN-T, in accordance with one or more embodiments described herein.

Referring next to FIGS. 5A and 5B, these figures together illustrate a flow diagram of an example, non-limiting computer-implemented method 500 that can facilitate multi-task training the RNN-T 302 and the VAD model 304, in accordance with one or more embodiments described herein. Further, in embodiments, such as generally illustrated in FIGS. 5A and 5B, a method of multi-task training the RNN-T 302 and the VAD model 304 can include receiving, by the processor, automatic speech recognition information (502). The method can also include training, by the processor, the RNN-T 302 using the ASR information (504). Further, in embodiments, the method can include integrating, by the processor, the encoder component 308 of the RNN-T 302 with the joint network component 306 of the RNN-T 302 and one or more outputs of the VAD model 304 to improve robustness to noise (506).

Turning now to FIG. 5B, the act of integrating the encoder component 308 of the RNN-T 302 with the VAD model 304 (506) is shown in further detail. At 508, the computer implemented method can comprise operating the VAD model 304 as a subtask of operating the RNN-T 302. Further, the computer implemented method can comprise classifying, via the encoder component, one or more inputs of the RNN-T 302 as one or more voice activity classes in relation to the pre-trained VAD model 304 (510).

At 512, the computer implemented method 500 can comprise integrating, by the processor, one or more outputs of the encoder component 308 into a same dimension as the one or more outputs of the VAD model 304. Further, in embodiments, the computer implemented method 500 can comprise applying an element wise-sum operation between the one or more outputs of the encoder 308 and the one or more outputs of the VAD model 304 at 514.

Figure 6:
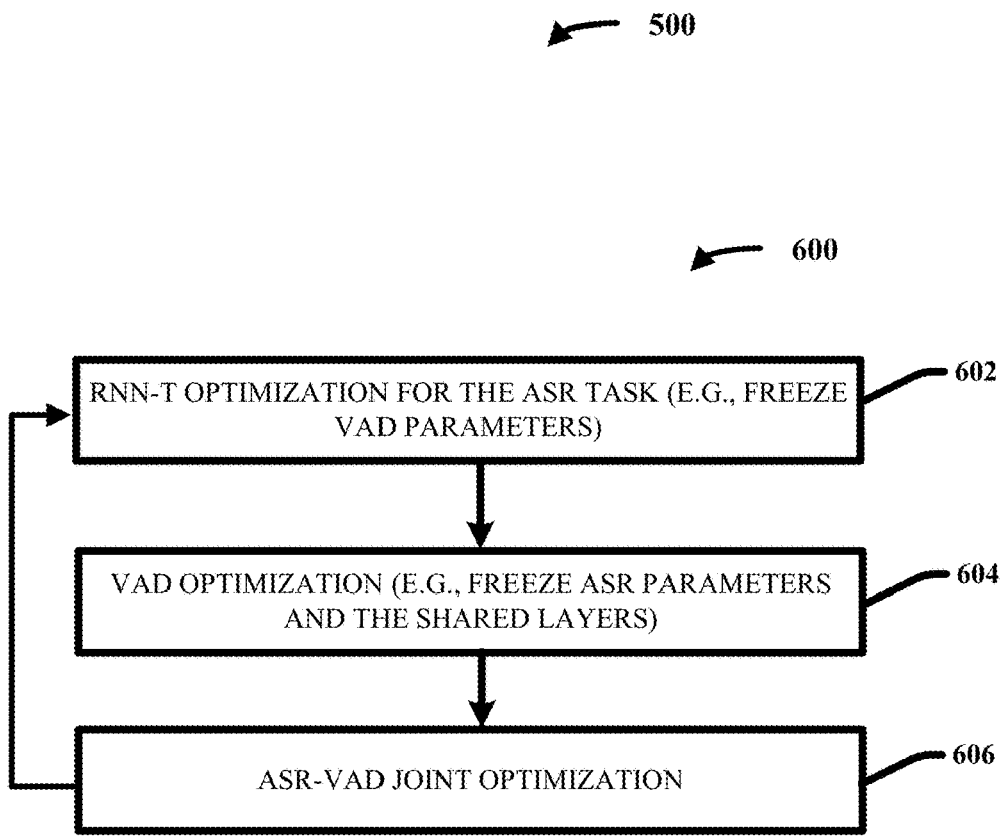
FIG. 6 illustrates a flow diagram of an example, non-limiting computer implemented method that facilitates integrating the VAD information into ASR, in accordance with one or more embodiments described herein.

Referring next to FIG. 6, the computer implemented method 500 can further comprise multi-task training using auxiliary VAD data. According to one or more embodiments, ASR performance can further be improved/optimized by freezing one or more parameters of the system (e.g., utilizing auxiliary VAD data as shown in process 600). At 602, the computer implemented method 600 can comprise optimizing the RNN-T 302 for the ASR task. The RNN-T 302 can be optimized by freezing only the VAD parameters and using the transcribed data. Further, the VAD integrated system 100 can be trained for ASR specific tasks by freezing parameters of the VAD model 304. The loss calculation for backpropagation can be represented by Eq. 4, below.

$$\text{Loss} = \text{LOSS}_{ASR} \qquad \text{Eq. 4:}$$

At 604, the computer implemented method 600 can comprise optimizing the VAD model 304 by freezing ASR parameters and the shared layers (e.g., between the RNN-T 302 and VAD model 304) and using transcribed and auxiliary un-transcribed data. In embodiments, freezing the ASR parameters can include freezing the joint network component 306, the encoder component 308, and/or the predictor component 310. The loss calculation for backpropagation can be represented by Eq. 5, below.

$$\text{Loss} = \text{Loss}_{VAD} \qquad \text{Eq. 5:}$$

At 606, the computer implemented method 600 can comprise jointly optimizing the ASR (e.g., the ASR RNN-T 302) and the VAD model 304. For example and without limitation, the computer implemented method 600 may include updating the VAD model 304 and the shared layer parameters (e.g., update the VAD model 304 and/or the encoder component 308) to optimize the VAD integrated system 100. For each training epoch of the computer implemented method 600, the VAD integrated system 100 can optimize using VAD specific data and/or the system 100 can optimize using ASR-VAD joint optimization. In embodiments, the VAD integrated system 100 can optimize for ASR task only (e.g., freeze VAD parameters), in response, the VAD integrated system 100 can optimize for VAD optimization only (e.g., freeze ASR parameters), and/or in further response, the VAD integrated system 100 can jointly optimize ASR and the VAD model 304. The system 100 can update the VAD model 304 and the shared layer parameters using un-transcribed VAD training data with a weighted loss. The weighted loss calculation can be represented by Eq. 6, below, where β is a hyper-parameter for VAD task loss weight for joint optimization.

$$\text{Loss} = \beta \cdot \text{Loss}_{VAD} \qquad \text{Eq. 6:}$$

In embodiments, updating the ASR and VAD parameters can include updating parameters of the VAD model 304, the joint network component 306, the encoder component 308, and/or the predictor component 310. Further, in embodiments, the ASR and VAD parameters can be updated using the shared transcribed data and the joint weighted loss as represented by Eq. 7, below, where α is a hyper-parameter for ASR task loss weight.

$$\text{Loss} = \alpha \cdot \text{LOSS}_{ASR} + \beta \cdot \text{LOSS}_{VAD} \qquad \text{Eq. 7:}$$

With embodiments, the system can utilize pseudo labels generated from a separately well-trained VAD model. This process of pseudo labels can be considered as knowledge distillation from the VAD to ASR. Knowledge distillation is a technique that can be implemented to mimic complicated teacher networks with a simple student network. The separate VAD model (e.g., a teacher VAD model) can be trained with a large amount of training data to generate better pseudo soft labels for a student VAD model where the student is a sub-task VAD network connected to the RNN-T ASR network. Distillation can be performed through the pseudo VAD labels $\tilde{v}$ obtained from the acoustic features x in the training material. The distillation technique can be represented by Eq. 8, below, where $p(\tilde{v}|x)$ is a VAD class posterior predicted by the teacher VAD. The v can then be utilized as the target label of the student VAD in the multi-task framework given x.

$$v = \arg\max_{\tilde{v}} p(\tilde{v}|x) \qquad \text{Eq. 8:}$$

Turning now to the results provided in FIGS. 7 and 8, the four tables 700, 800, 802, and/or 804, show the results of one or more various experiments. In a first experiment, Switchboard (SWB) corpus consisting of about 300-hour multi-speaker American-English speech from telephone conversations can be used. The data can be augmented by including the non-speech segments longer than 2 seconds in the training material (e.g., such segments are typically discarded in common training settings). Augmenting the data produced about 88 hours of non-speech only data and about 599 hours of utterances mixed with speech and non-speech segments, in addition to the standard 267 hours of the SWB data.

In a second experiment, the auxiliary VAD training data for the updates with the VAD criterion in the multi-task learning framework of FIG. 6 can be prepared. The data includes about 200 hours of English call center (CC) conversations together with 200 hours of non-speech without a transcription available. In this dataset, environmental noises were added to the training sets for the model training. The resulting average speech-to-noise ratio (SNR) was 14 dB.

In embodiments, such as at least partially embodied in FIG. 3B, the RNN-T can comprise 6 bidirectional long short-term memory (Bi-LSTM) encoder layers with 640 cells per layer per direction and a single unidirectional LSTM prediction layer with only 1024 cells. The joint network can project the 1280-dimensional stacked encoder vectors from the last layer and the 1024-dimensional prediction net embedding to 256 dimensions and/or combine the projected vectors. After the application of a hyperbolic tangent, the output is projected to 42 logits followed by a softmax layer corresponding to 41 characters. 40-dimensional speakers independent log-Mel filterbank features can be extracted every 10 ms as ASR features. After utterance level mean and global variance normalization, these features can be augmented with delta and double delta coefficients. The independent CNN-based VAD can generate frame-level VAD labels, which can be utilized via feature integration and/or multi-task learning systems.

Further, in embodiments, the isolated VAD model can comprise four convolutional layers with the input channels 3, 16, 32, and 2 respectively from the first to last layer and/or the output class dimension of 3 in classifying the speech frame into speech, non-speech, and music classes. The isolated VAD can be trained (e.g., in experiments) on more than 2000-hour English speech data consisting of various ASR domains including both spontaneous and read speech. On the other hand, the VAD component is a sub-task for MTL 2, MTL 3, and MTL 4 (composed of three stacks of FC layers). In MTL 2, the first three encoder layers can be shared between ASR and VAD tasks. The learning rate for ASR included a value of 2e-4, and the learning rate for VAD in the multi-task learning framework included a value of 2e-5. Both systems can be optimized by using the stochastic gradient descent (SGD) with a batch size of 64.

Further, as shown in FIG. 7 and, experiments were carried out using speech-only segments and also those combined with the non-speech segments simulating VAD prediction errors. Results of these experiments are shown in tables 700 and 702 with ASR word error rate abbreviated as WER % and frame-level VAD equal error rate abbreviated as EER %. The baseline and proposed systems were evaluated on modified SWB and Callhome (CH) test sets created by artificially adding various lengths of non-speech segments before speech, after speech, or between two speech segments. Non-speech segments added to each test utterance are sec on average. Realistic environmental noises were also added to these test sets. In addition, speech-only and noise-only (non-speech) tests were also conducted.

Experimental results in tables 700 and 800 show that a standard RNN-T tagged as "No aug" trained with the original SWB training corpus performed well under manually-segmented ideal speech-only input condition, but performance degraded drastically in more realistic cases with the speech combined with long non-speech portions. Under this condition, the text decoded by "Standard RNN-T (No aug)" contains many unexpected insertion errors on non-speech parts. In contrast, adding non-speech segments to training dataset ("Standard RNN-T (Aug)") can significantly decrease a number of those errors, which can be also seen in table 800.

In various test conditions, post-encoder feature integration performs better than pre-encoder feature integration (see, e.g., table 700). Although WERs by post-encoder integration on "Speech+Non-speech" and "Speech-only" input cases were similar to "Standard RNN-T (Aug)", this technique significantly reduced insertion errors in the test case of non-speech only as shown in 800.

Next, turning to multi-task learning, experimental results are also tabulated in 700 and 800. When the VAD auxiliary data was not utilized, MTL 4 (β=0.01) provided largest improvement in the "Speech+Non-speech" test case. Further improvements were obtained by utilizing auxiliary VAD training data (VAD aux-data) in MTL 2, MTL 3, and MTL 4. The models and/or non-limiting embodiments improved WERs for not only "Speech+Non-speech" but also "Speech-only" test cases compared with models without auxiliary VAD data. "MTL 4+VAD aux-data" indicated best performance yielded relative improvements of 21.5% and 3.6% in the "Speech+Non-speech" test case compared with the standard RNN-T without and with data augmentation, respectively. Also, "MTL 4+VAD aux-data" provided a relative improvement of 4.6% in the speech-only test case compared with "Standard RNN-T (Aug)".

In embodiments, experiments can be conducted with audio signals automatically segmented by the separate VAD system (e.g., which, in turn, can be used to generate VAD labels). The results of said experiment is shown in FIG. 8 under table 802. Because various kinds of segmentation errors in the VAD results at low SNRs included the classification of speech segment as noise, the absolute WERs in table 802 were larger than those in table 700 on average. However, the VAD integrated system 100 showed consistent gains over the baseline systems.

Turning now to table 804 of FIG. 8, indicating the results of acoustic customization via the VAD sub-task optimization with additional test data (CC) that is the same domain as the VAD auxiliary data (including WERs on different SNRs). CC is an acoustically out-of-domain test set, and therefore absolute WERs are high. By adding VAD auxiliary data to the training data, "MTL 4+VAD aux-data" yielded improvements for both CC and SWB/CH test sets in every SNR setting. The gap in WER between "standard RNN-T (Aug)" and "MTL 4+VAD aux-data" tends to become larger as the SNR decreases.

In embodiments, further experimentation and/or performance of the VAD integrated system 100 can be illustrated via FIGS. 8B, 8C, and/or 8D. The VAD integrated system 100 can be experimented on via test sets "CH" and "Internal CC" for monaural recordings, separated channel A, or separated channel B. Table 806 includes experimentation results indicating the effectiveness of the VAD integrated system 100 on manually segmented speech-only noisy audio in an average SNR 4 dB mixed with car noise sounds. Additionally, table 808 (e.g., FIG. 8C) includes experimentation results indicating the effectiveness of the VAD integrated system 100 on manually segmented speech and non-speech. For example and without limitation, the non-speech segment can be greater than or equal to about 2 seconds.

Turning now to table 810 of FIG. 8C, indicating additional results of experimentation of the VAD integrated system 100 via SWB and CH test sets. Further, table 812 illustrates experimentation results from manually segmenting noisy speech at a variety of SNR levels (e.g., SNR levels of 14.2 dB, 4.2 dB, and/or 1.4 dB). In addition, experimentation can be illustrated by table 814 and/or table 816. As shown in FIG. 8D, table 814 shows experimental results achieved by manually segmenting noisy speech and non-speech at variety of SNR levels (e.g., SNR levels of 14 dB, 4.2 dB, and/or 1.4 dB). Table 816 shows the effectiveness of the VAD integrated system at a variety of speech segments. Speech segments can include non-speech only 404, front silence 406, back silence 410, and/or middle silence 412 (see, e.g., FIG. 4).

In a situation with acoustically challenging data to which the unsupervised and semi-supervised training of ASR cannot be applied, the computer implemented method can show a promising improvement, which is relatively computationally inexpensive. The experimental results of tables 700, 800, 802, 804, 806, 808, 810, 812, 814, and/or 816 indicate the ability to enhance the system robustness against noisy environments.

For simplicity of explanation, the computer-implemented methodologies are depicted and described as a series of acts. It is to be understood and appreciated that the subject innovation is not limited by the acts illustrated and/or by the order of acts, for example acts can occur in various orders and/or concurrently, and with other acts not presented and described herein. Furthermore, not all illustrated acts can be required to implement the computer-implemented methodologies in accordance with the disclosed subject matter. In addition, those skilled in the art will understand and appreciate that the computer-implemented methodologies could alternatively be represented as a series of interrelated states via a state diagram or events. Additionally, it should be further appreciated that the computer-implemented methodologies disclosed hereinafter and throughout this specification are capable of being stored on an article of manufacture to facilitate transporting and transferring the computer-implemented methodologies to computers. The term article of manufacture, as used herein, is intended to encompass a computer program accessible from any computer-readable device or storage media.

Figure 9:
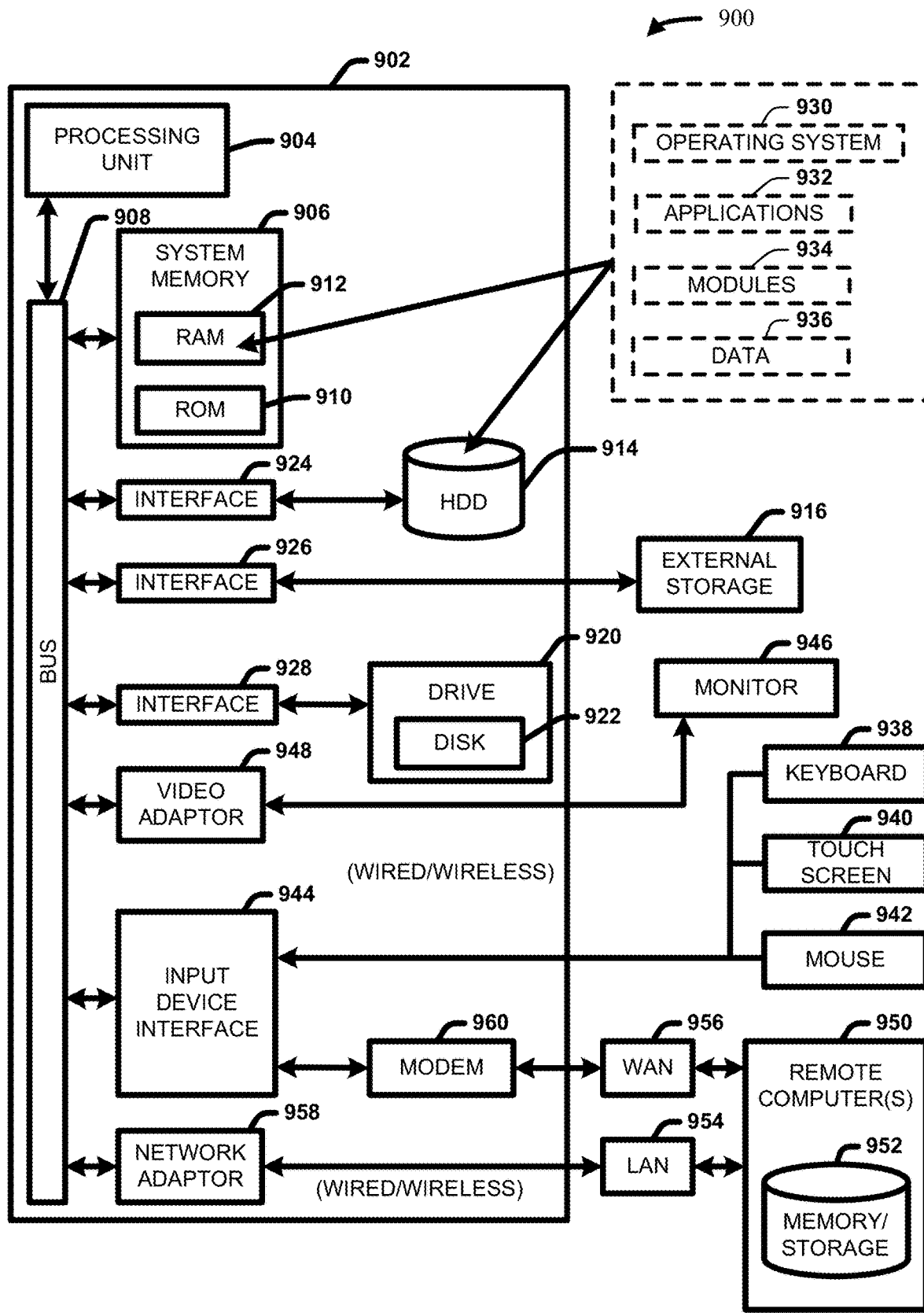
FIG. 9 illustrates a block diagram of an example, non-limiting operating environment in which one or more embodiments described herein can be facilitated.

In order to provide additional context for various embodiments described herein, FIG. 9 and the following discussion are intended to provide a general description of a suitable operating environment 900 in which the various embodiments described herein can be implemented. While the embodiments have been described above in the general context of computer-executable instructions that can run on one or more computers, those skilled in the art will recognize that the embodiments can be also implemented in combination with other program modules and/or as a combination of hardware and software.

Generally, program modules include routines, programs, components, data structures and/or the like that perform particular tasks and/or implement particular abstract data types. Moreover, those skilled in the art will appreciate that the inventive methods can be practiced with other computer system configurations, including single-processor or multiprocessor computer systems, minicomputers, mainframe computers, Internet of Things (IoT) devices, distributed computing systems, as well as personal computers, handheld computing devices, microprocessor-based or programmable consumer electronics, and the like, each of which can be operatively coupled to one or more associated devices.

The illustrated embodiments of the embodiments herein can be also practiced in distributed computing environments where certain tasks are performed by remote processing devices that are linked through a communications network. In a distributed computing environment, program modules can be located both in local and remote memory storage devices.

Computing devices typically include a variety of media, which can include computer-readable storage media, machine-readable storage media and/or communications media, which two terms are used herein differently from one another as follows. Computer-readable storage media or machine-readable storage media can be any available storage media that can be accessed by the computer and includes both volatile and nonvolatile media, removable and non-removable media. By way of example, but not limitation, computer-readable storage media and/or machine-readable storage media can be implemented in connection with any method or technology for storage of information such as computer-readable and/or machine-readable instructions, program modules, structured data and/or unstructured data.

Computer-readable storage media can include, but are not limited to, random access memory (RAM), read only memory (ROM), electrically erasable programmable read only memory (EEPROM), flash memory or other memory technology, compact disk read only memory (CD ROM), digital versatile disk (DVD), Blu-ray disc (BD) and/or other optical disk storage, magnetic cassettes, magnetic tape, disk storage and/or other magnetic storage devices, solid state drives and/or other solid state storage devices, and/or other tangible and/or non-transitory media which can be used to store desired information. In this regard, the terms "tangible" or "non-transitory" herein as applied to storage, memory or computer-readable media, are to be understood to exclude only propagating transitory signals per se as modifiers and do not relinquish rights to all standard storage, memory and/or computer-readable media that are not only propagating transitory signals per se.

Computer-readable storage media can be accessed by one or more local or remote computing devices, e.g., via access requests, queries and/or other data retrieval protocols, for a variety of operations with respect to the information stored by the medium.

Communications media typically embody computer-readable instructions, data structures, program modules or other structured or unstructured data in a data signal such as a modulated data signal, e.g., a carrier wave or other transport mechanism, and includes any information delivery or transport media. The term "modulated data signal" or signals refers to a signal that has one or more of its characteristics set or changed in such a manner as to encode information in one or more signals. By way of example, but not limitation, communication media can include wired media, such as a wired network and/or direct-wired connection, and/or wireless media such as acoustic, RF, infrared and/or other wireless media.

With reference again to FIG. 9, the example operating environment 900 for implementing various embodiments of the aspects described herein includes a computer 902, the computer 902 including a processing unit 904, a system memory 906 and/or a system bus 908. The system bus 908 can couple system components including, but not limited to, the system memory 906 to the processing unit 904. The processing unit 904 can be any of various commercially available processors. Dual microprocessors and/or other multi-processor architectures can be employed as the processing unit 904.

The system bus 908 can be any of several types of bus structure that can further interconnect to a memory bus (with or without a memory controller), a peripheral bus and/or a local bus using any of a variety of commercially available bus architectures. The system memory 906 can include ROM 910 and/or RAM 912. A basic input/output system (BIOS) can be stored in a non-volatile memory such as ROM, erasable programmable read only memory (EPROM) and/or EEPROM, which BIOS contains the basic routines that help to transfer information among elements within the computer 902, such as during startup. The RAM 912 can also include a high-speed RAM, such as static RAM for caching data.

The computer 902 further can include an internal hard disk drive (HDD) 914 (e.g., EIDE, SATA), one or more external storage devices 916 (e.g., a magnetic floppy disk drive (FDD), a memory stick or flash drive reader, a memory card reader and/or the like) and/or a drive 920, e.g., such as a solid state drive or an optical disk drive, which can read or write from a disk 922, such as a CD-ROM disc, a DVD, a BD and/or the like. Alternatively, where a solid state drive is involved, disk 922 could not be included, unless separate. While the internal HDD 914 is illustrated as located within the computer 902, the internal HDD 914 can also be configured for external use in a suitable chassis (not shown). Additionally, while not shown in operating environment 900, a solid state drive (SSD) could be used in addition to, or in place of, an HDD 914. The HDD 914, external storage device(s) 916 and drive 920 can be connected to the system bus 908 by an HDD interface 924, an external storage interface 926 and a drive interface 928, respectively. The HDD interface 924 for external drive implementations can include at least one or both of Universal Serial Bus (USB) and Institute of Electrical and Electronics Engineers (IEEE) 1394 interface technologies. Other external drive connection technologies are within contemplation of the embodiments described herein.

The drives and their associated computer-readable storage media provide nonvolatile storage of data, data structures, computer-executable instructions, and so forth. For the computer 802, the drives and storage media accommodate the storage of any data in a suitable digital format. Although the description of computer-readable storage media above refers to respective types of storage devices, it should be appreciated by those skilled in the art that other types of storage media which are readable by a computer, whether presently existing or developed in the future, could also be used in the example operating environment, and further, that any such storage media can contain computer-executable instructions for performing the methods described herein.

A number of program modules can be stored in the drives and RAM 912, including an operating system 930, one or more applications 932, other program modules 934 and/or program data 936. All or portions of the operating system, applications, modules and/or data can also be cached in the RAM 912. The systems and methods described herein can be implemented utilizing various commercially available operating systems and/or combinations of operating systems.

Computer 902 can optionally comprise emulation technologies. For example, a hypervisor (not shown) or other intermediary can emulate a hardware environment for operating system 930, and the emulated hardware can optionally be different from the hardware illustrated in FIG. 8. In a related embodiment, operating system 930 can comprise one virtual machine (VM) of multiple VMs hosted at computer 902. Furthermore, operating system 930 can provide runtime environments, such as the JAVA runtime environment or the .NET framework, for applications 932. Runtime environments are consistent execution environments that allow applications 932 to run on any operating system that includes the runtime environment. Similarly, operating system 930 can support containers, and applications 932 can be in the form of containers, which are lightweight, standalone, executable packages of software that include, e.g., code, runtime, system tools, system libraries and/or settings for an application.

Further, computer 902 can be enabled with a security module, such as a trusted processing module (TPM). For instance, with a TPM, boot components hash next in time boot components and wait for a match of results to secured values before loading a next boot component. This process can take place at any layer in the code execution stack of computer 902, e.g., applied at application execution level and/or at operating system (OS) kernel level, thereby enabling security at any level of code execution.

A user entity can enter commands and information into the computer 902 through one or more wired/wireless input devices, e.g., a keyboard 938, a touch screen 940 and/or a pointing device, such as a mouse 942. Other input devices (not shown) can include a microphone, an infrared (IR) remote control, a radio frequency (RF) remote control, or other remote control, a joystick, a virtual reality controller and/or virtual reality headset, a game pad, a stylus pen, an image input device, e.g., camera(s), a gesture sensor input device, a vision movement sensor input device, an emotion or facial detection device, a biometric input device, e.g., fingerprint or iris scanner, or the like. These and other input devices can be connected to the processing unit 904 through an input device interface 944 that can be coupled to the system bus 908, but can be connected by other interfaces, such as a parallel port, an IEEE 1394 serial port, a game port, a USB port, an IR interface, a BLUETOOTH® interface and/or the like.

A monitor 946 or other type of display device can be also connected to the system bus 808 via an interface, such as a video adapter 948. In addition, a computer typically includes other peripheral output devices (not shown), such as speakers, printers and/or the like.

The computer 902 can operate in a networked environment using logical connections via wired and/or wireless communications to one or more remote computers, such as a remote computer(s) 950. The remote computer(s) 950 can be a workstation, a server computer, a router, a personal computer, portable computer, microprocessor-based entertainment appliance, a peer device and/or other common network node, and typically includes many or all of the elements described relative to the computer 902, although, for purposes of brevity, only a memory/storage device 952 is illustrated. The logical connections depicted include wired/wireless connectivity to a local area network (LAN) 954 and/or larger networks, e.g., a wide area network (WAN) 956. LAN and WAN networking environments are commonplace in offices and companies, and facilitate enterprise-wide computer networks, such as intranets, all of which can connect to a global communications network, e.g., the Internet.

When used in a LAN networking environment, the computer 902 can be connected to the local network 954 through a wired and/or wireless communication network interface or adapter 958. The adapter 958 can facilitate wired or wireless communication to the LAN 954, which can also include a wireless access point (AP) disposed thereon for communicating with the adapter 958 in a wireless mode.

When used in a WAN networking environment, the computer 902 can include a modem 960 and/or can be connected to a communications server on the WAN 956 via other means for establishing communications over the WAN 956, such as by way of the Internet. The modem 960, which can be internal or external and a wired and/or wireless device, can be connected to the system bus 908 via the input device interface 944. In a networked environment, program modules depicted relative to the computer 902 or portions thereof, can be stored in the remote memory/storage device 952. It will be appreciated that the network connections shown are example and other means of establishing a communications link among the computers can be used.

When used in either a LAN or WAN networking environment, the computer 902 can access cloud storage systems or other network-based storage systems in addition to, or in place of, external storage devices 916 as described above, such as but not limited to, a network virtual machine providing one or more aspects of storage or processing of information. Generally, a connection between the computer 902 and a cloud storage system can be established over a LAN 954 or WAN 956 e.g., by the adapter 958 or modem 960, respectively. Upon connecting the computer 902 to an associated cloud storage system, the external storage interface 926 can, with the aid of the adapter 958 and/or modem 960, manage storage provided by the cloud storage system as it would other types of external storage. For instance, the external storage interface 926 can be configured to provide access to cloud storage sources as if those sources were physically connected to the computer 902.

The computer 902 can be operable to communicate with any wireless devices or entities operatively disposed in wireless communication, e.g., a printer, scanner, desktop and/or portable computer, portable data assistant, communications satellite, any piece of equipment or location associated with a wirelessly detectable tag (e.g., a kiosk, news stand, store shelf and/or the like), and/or telephone. This can include Wireless Fidelity (Wi-Fi) and BLUETOOTH® wireless technologies. Thus, the communication can be a predefined structure as with a conventional network or simply an ad hoc communication between at least two devices.

Referring now to FIG. 10, an illustrative cloud computing environment 1050 is depicted. As shown, cloud computing environment 1050 includes one or more cloud computing nodes 1010 with which local computing devices used by cloud consumers, such as, for example, personal digital assistant (PDA) or cellular telephone 1054A, desktop computer 1054B, laptop computer 1054C and/or automobile computer system 1054N can communicate. Although not illustrated in FIG. 10, cloud computing nodes 1010 can further comprise a quantum platform (e.g., quantum computer, quantum hardware, quantum software and/or the like) with which local computing devices used by cloud consumers can communicate. Cloud computing nodes 1010 can communicate with one another. They can be grouped (not shown) physically or virtually, in one or more networks, such as Private, Community, Public, or Hybrid clouds as described hereinabove, or a combination thereof. This allows cloud computing environment 1050 to offer infrastructure, platforms and/or software as services for which a cloud consumer does not need to maintain resources on a local computing device. It is understood that the types of computing devices 1054A-N shown in FIG. 10 are intended to be illustrative only and that cloud computing nodes 1010 and cloud computing environment 1050 can communicate with any type of computerized device over any type of network and/or network addressable connection (e.g., using a web browser).

Figure 11:
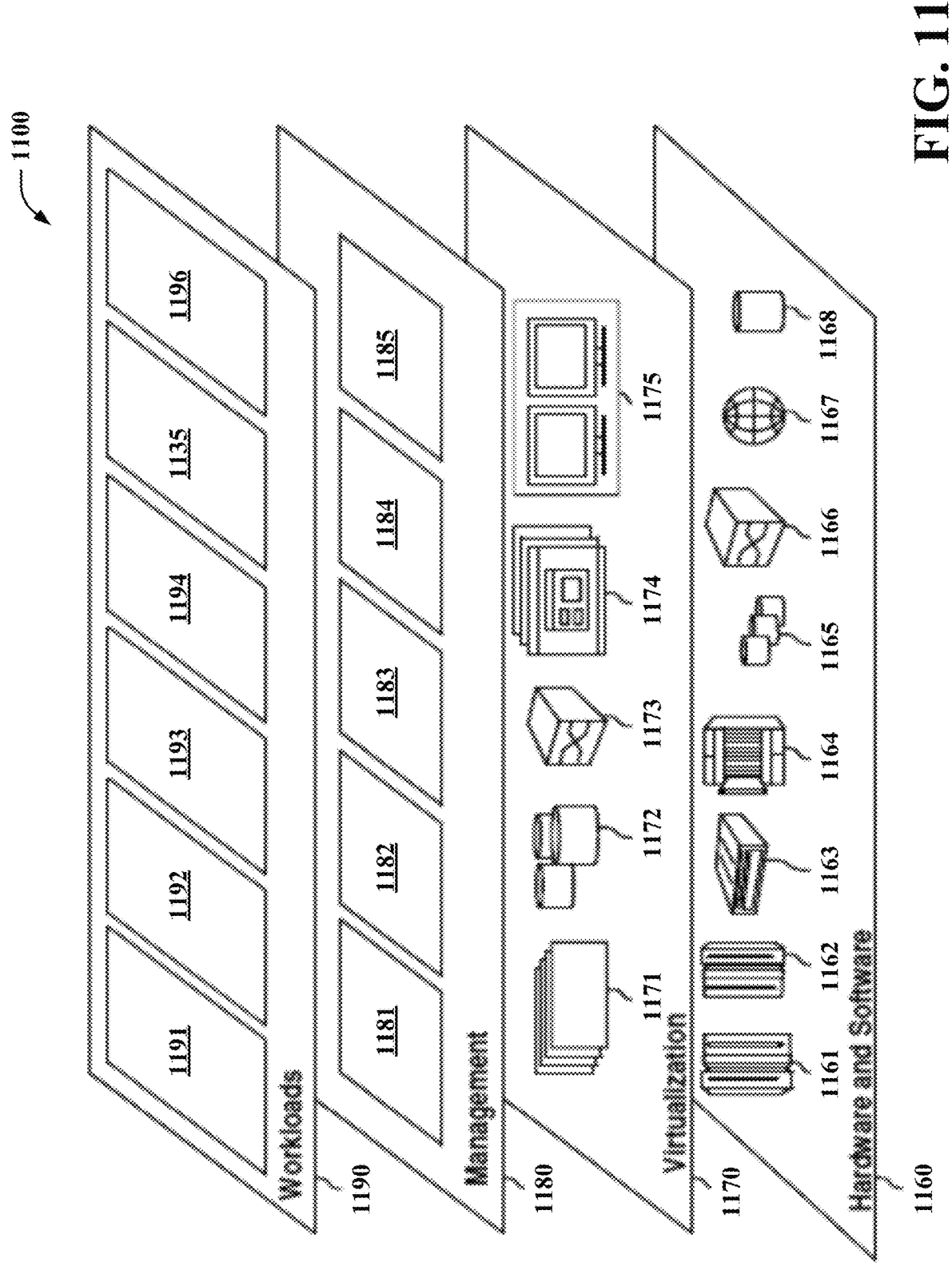
FIG. 11 illustrates a block diagram of a plurality of example, non-limiting abstraction model layers, in accordance with one or more embodiments described herein.

Referring now to FIG. 11, a set of functional abstraction layers is shown, such as provided by cloud computing environment 1050 (FIG. 10). It should be understood in advance that the components, layers and functions shown in FIG. 11 are intended to be illustrative only and embodiments described herein are not limited thereto. As depicted, the following layers and corresponding functions are provided:

Hardware and software layer 1160 can include hardware and software components. Examples of hardware components include mainframes 1161; RISC (Reduced Instruction Set Computer) architecture-based servers 1162; servers 1163; blade servers 1164; storage devices 1165; and networks and networking components 1166. In some embodiments, software components can include network application server software 1167, quantum platform routing software 1168 and/or quantum software (not illustrated in FIG. 11).

Virtualization layer 1170 can provide an abstraction layer from which the following examples of virtual entities can be provided: virtual servers 1171; virtual storage 1172; virtual networks 1173, including virtual private networks; virtual applications and/or operating systems 1174; and/or virtual clients 1175.

In one example, management layer 1180 can provide the functions described below. Resource provisioning 1181 can provide dynamic procurement of computing resources and other resources that can be utilized to perform tasks within the cloud computing environment. Metering and Pricing 1182 can provide cost tracking as resources are utilized within the cloud computing environment, and billing or invoicing for consumption of these resources. In one example, these resources can include application software licenses. Security can provide identity verification for cloud consumers and tasks, as well as protection for data and other resources. User (or constituent) portal 1183 can provide access to the cloud computing environment for consumers and system administrators. Service level management 1184 can provide cloud computing resource allocation and management such that required service levels are met. Service Level Agreement (SLA) planning and fulfillment 1185 can provide pre-arrangement for, and procurement of, cloud computing resources for which a future requirement is anticipated in accordance with an SLA.

Workloads layer 1190 can provide examples of functionality for which the cloud computing environment can be utilized. Non-limiting examples of workloads and functions which can be provided from this layer include: mapping and navigation 1191; software development and lifecycle management 1192; virtual classroom education delivery 1193; data analytics processing 1094; transaction processing 1195; and/or application transformation software 1196.

The embodiments described herein can be directed to one or more of a system, a method, an apparatus and/or a computer program product at any possible technical detail level of integration. The computer program product can include a computer readable storage medium (or media) having computer readable program instructions thereon for causing a processor to carry out aspects of the one or more embodiments described herein. The computer readable storage medium can be a tangible device that can retain and store instructions for use by an instruction execution device. The computer readable storage medium can be, for example, but is not limited to, an electronic storage device, a magnetic storage device, an optical storage device, an electromagnetic storage device, a semiconductor storage device and/or any suitable combination of the foregoing. A non-exhaustive list of more specific examples of the computer readable storage medium can also include the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and/or any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network can comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device. Computer readable program instructions for carrying out operations of the one or more embodiments described herein can be assembler instructions, instruction-set-architecture (ISA) instructions, machine instructions, machine dependent instructions, microcode, firmware instructions, state-setting data, configuration data for integrated circuitry or either source code or object code written in any combination of one or more programming languages, including an object oriented programming language such as Smalltalk, C++, or the like, and/or procedural programming languages, such as the "C" programming language or similar programming languages. The computer readable program instructions can execute entirely on the user's computer, partly on the user's computer, as a stand-alone software package, partly on the user's computer and/or partly on a remote computer or entirely on the remote computer or server. In the latter scenario, the remote computer can be connected to the user's computer through any type of network, including a local area network (LAN) or a wide area network (WAN), or the connection can be made to an external computer (for example, through the Internet using an Internet Service Provider). In some embodiments, electronic circuitry including, for example, programmable logic circuitry, field-programmable gate arrays (FPGA) and/or programmable logic arrays (PLA) can execute the computer readable program instructions by utilizing state information of the computer readable program instructions to personalize the electronic circuitry, in order to perform aspects of the one or more embodiments described herein.

Aspects of the one or more embodiments described herein are described herein with reference to flowchart illustrations and/or block diagrams of methods, apparatus (systems), and computer program products according to one or more embodiments described herein. It will be understood that each block of the flowchart illustrations and/or block diagrams, and combinations of blocks in the flowchart illustrations and/or block diagrams, can be implemented by computer readable program instructions. These computer readable program instructions can be provided to a processor of a general purpose computer, special purpose computer and/or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions can also be stored in a computer readable storage medium that can direct a computer, a programmable data processing apparatus and/or other devices to function in a particular manner, such that the computer readable storage medium having instructions stored therein comprises an article of manufacture including instructions which implement aspects of the function/act specified in the flowchart and/or block diagram block or blocks. The computer readable program instructions can also be loaded onto a computer, other programmable data processing apparatus, and/or other device to cause a series of operational acts to be performed on the computer, other programmable apparatus or other device to produce a computer implemented process, such that the instructions which execute on the computer, other programmable apparatus and/or other device implement the functions/acts specified in the flowchart and/or block diagram block or blocks.

The flowcharts and block diagrams in the figures illustrate the architecture, functionality, and operation of possible implementations of systems, computer-implementable methods and/or computer program products according to various embodiments described herein. In this regard, each block in the flowchart or block diagrams can represent a module, segment and/or portion of instructions, which comprises one or more executable instructions for implementing the specified logical function(s). In some alternative implementations, the functions noted in the blocks can occur out of the order noted in the Figures. For example, two blocks shown in succession can, in fact, be executed substantially concurrently, or the blocks can sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions and/or acts or carry out combinations of special purpose hardware and/or computer instructions.

While the subject matter has been described above in the general context of computer-executable instructions of a computer program product that runs on a computer and/or computers, those skilled in the art will recognize that the one or more embodiments herein also can be implemented in combination with other program modules. Generally, program modules include routines, programs, components, data structures and/or the like that perform particular tasks and/or implement particular abstract data types. Moreover, those skilled in the art will appreciate that the inventive computer-implemented methods can be practiced with other computer system configurations, including single-processor or multi-processor computer systems, mini-computing devices, mainframe computers, as well as computers, hand-held computing devices (e.g., PDA, phone), microprocessor-based or programmable consumer or industrial electronics, and/or the like. The illustrated aspects can also be practiced in distributed computing environments in which tasks are performed by remote processing devices that are linked through a communications network. However, some, if not all aspects of the one or more embodiments can be practiced on stand-alone computers. In a distributed computing environment, program modules can be located in both local and remote memory storage devices.

As used in this application, the terms "component," "system," "platform," "interface," and/or the like, can refer to and/or can include a computer-related entity or an entity related to an operational machine with one or more specific functionalities. The entities disclosed herein can be either hardware, a combination of hardware and software, software, or software in execution. For example, a component can be, but is not limited to being, a process running on a processor, a processor, an object, an executable, a thread of execution, a program and/or a computer. By way of illustration, both an application running on a server and the server can be a component. One or more components can reside within a process and/or thread of execution and a component can be localized on one computer and/or distributed between two or more computers. In another example, respective components can execute from various computer readable media having various data structures stored thereon. The components can communicate via local and/or remote processes such as in accordance with a signal having one or more data packets (e.g., data from one component interacting with another component in a local system, distributed system and/or across a network such as the Internet with other systems via the signal). As another example, a component can be an apparatus with specific functionality provided by mechanical parts operated by electric or electronic circuitry, which is operated by a software or firmware application executed by a processor. In such a case, the processor can be internal or external to the apparatus and can execute at least a part of the software or firmware application. As yet another example, a component can be an apparatus that provides specific functionality through electronic components without mechanical parts, where the electronic components can include a processor or other means to execute software or firmware that confers at least in part the functionality of the electronic components. In an aspect, a component can emulate an electronic component via a virtual machine, e.g., within a cloud computing system.

In addition, the term "or" is intended to mean an inclusive "or" rather than an exclusive "or." That is, unless specified otherwise, or clear from context, "X employs A or B" is intended to mean any of the natural inclusive permutations. That is, if X employs A; X employs B; or X employs both A and B, then "X employs A or B" is satisfied under any of the foregoing instances. Moreover, articles "a" and "an" as used in the subject specification and annexed drawings should generally be construed to mean "one or more" unless specified otherwise or clear from context to be directed to a singular form. As used herein, the terms "example" and/or "exemplary" are utilized to mean serving as an example, instance, or illustration. For the avoidance of doubt, the subject matter disclosed herein is not limited by such examples. In addition, any aspect or design described herein as an "example" and/or "exemplary" is not necessarily to be construed as preferred or advantageous over other aspects or designs, nor is it meant to preclude equivalent exemplary structures and techniques known to those of ordinary skill in the art.

As it is employed in the subject specification, the term "processor" can refer to substantially any computing processing unit or device comprising, but not limited to, single-core processors; single-processors with software multithread execution capability; multi-core processors; multi-core processors with software multithread execution capability; multi-core processors with hardware multithread technology; parallel platforms; and parallel platforms with distributed shared memory. Additionally, a processor can refer to an integrated circuit, an application specific integrated circuit (ASIC), a digital signal processor (DSP), a field programmable gate array (FPGA), a programmable logic controller (PLC), a complex programmable logic device (CPLD), a discrete gate or transistor logic, discrete hardware components, or any combination thereof designed to perform the functions described herein. Further, processors can exploit nano-scale architectures such as, but not limited to, molecular and quantum-dot based transistors, switches and gates, in order to optimize space usage or enhance performance of user equipment. A processor can also be implemented as a combination of computing processing units. Herein, terms such as "store," "storage," "data store," data storage," "database," and substantially any other information storage component relevant to operation and functionality of a component are utilized to refer to "memory components," entities embodied in a "memory," or components comprising a memory. It is to be appreciated that memory and/or memory components described herein can be either volatile memory or nonvolatile memory or can include both volatile and nonvolatile memory. By way of illustration, and not limitation, nonvolatile memory can include read only memory (ROM), programmable ROM (PROM), electrically programmable ROM (EPROM), electrically erasable ROM (EEPROM), flash memory and/or nonvolatile random access memory (RAM) (e.g., ferroelectric RAM (FeRAM). Volatile memory can include RAM, which can act as external cache memory, for example. By way of illustration and not limitation, RAM is available in many forms such as synchronous RAM (SRAM), dynamic RAM (DRAM), synchronous DRAM (SDRAM), double data rate SDRAM (DDR SDRAM), enhanced SDRAM (ESDRAM), Synchlink DRAM (SLDRAM), direct Rambus RAM (DRRAM), direct Rambus dynamic RAM (DRDRAM) and/or Rambus dynamic RAM (RDRAM). Additionally, the disclosed memory components of systems and/or computer-implemented methods herein are intended to include, without being limited to including, these and any other suitable types of memory.

What has been described above include mere examples of systems and computer-implemented methods. It is, of course, not possible to describe every conceivable combination of components or computer-implemented methods for purposes of describing the one or more embodiments, but one of ordinary skill in the art can recognize that many further combinations and permutations of the one or more embodiments are possible. Furthermore, to the extent that the terms "includes," "has," "possesses," and the like are used in the detailed description, claims, appendices and drawings such terms are intended to be inclusive in a manner similar to the term "comprising" as "comprising" is interpreted when employed as a transitional word in a claim.

The descriptions of the various embodiments have been presented for purposes of illustration but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A system comprising:
a memory that stores computer executable components; and
a processor, operably coupled to the memory, and that executes the computer executable components stored in the memory, wherein the computer executable components comprise:
a recurrent neural network transducer (RNN-T) that receives automatic speech recognition (ASR) information;
a voice activity detection (VAD) model that trains the RNN-T using the ASR information via multitask training; and
wherein the RNN-T further comprises an encoder and a joint network; and one or more outputs of the encoder are integrated with the joint network and one or more outputs of the VAD model by projecting the one or more outputs of the VAD model into a same dimension as the one or more outputs of the encoder via a fully connected layer.

2. The system of claim 1, wherein the encoder is used as a shared layer for activity of the VAD model and the RNN-T.

3. The system of claim 1, wherein the encoder classifies one or more inputs of the RNN-T as one or more voice activity classes via a pre-trained VAD model.

4. The system of claim 1, wherein the VAD model operates as a subtask of the RNN-T.

5. The system of claim 1, wherein the one or more outputs of the encoder are transmitted to the joint network.

6. The system of claim 1, wherein an element-wise sum operation is applied between the one or more outputs of the encoder and the one or more outputs of the VAD model to improve robustness to noise.

7. The system of claim 1, wherein the system is optimized based on VAD parameters; and the VAD model and RNN-T are jointly optimized.

8. The system of claim 7, wherein the system is further optimized by freezing one or more parameters of at least one of the ASR information and the VAD parameters to determine backpropagation.

9. The system of claim 1, wherein one or more non-speech segments are added to one or more speech segments of the ASR information to proactively train the VAD model and the RNN-T.

10. A computer implemented method, comprising:
receiving, by the processor, automatic speech recognition (ASR) information;
multi-task training, by the processor, the RNN-T using the ASR information; and
integrating, by the processor, an encoder of the RNN-T with a joint network of the RNN-T and one or more outputs of a voice activity detection (VAD) model by projecting the one or more outputs of the VAD model into a same dimension as one or more outputs of the encoder via a fully connected layer to improve robustness to noise.

11. The computer implemented method of claim 10, wherein the encoder is used as a shared layer for activity of the VAD model and the RNN-T.

12. The computer implemented method of claim 10, further comprising:
classifying, by the processor, one or more inputs of the RNN-T as one or more voice activity classes in relation to a pre-trained VAD model.

13. The computer implemented method of claim 10, further comprising:
operating the VAD model as a subtask of operating the RNN-T.

14. The computer implemented method of claim 10, further comprising:
applying an element wise-sum operation between the one or more outputs of the encoder and the one or more outputs of the VAD model.

15. A computer program product for training a recurrent neural network transducer (RNN-T) with a voice activity detection (VAD) model, the computer program product comprising a computer readable storage medium having program instructions embodied therewith, the program instructions executable by a processor to cause the processor to:
receive, by the processor, automatic speech recognition (ASR) information;
multi-task train, by the processor, the RNN-T using the ASR information;

integrate, by the processor, an encoder of the RNN-T with a joint network of the RNN-T and one or more outputs of the VAD model by projecting the one or more outputs of the VAD model into a same dimension as one or more outputs of the encoder via a fully connected layer.

16. The computer program product of claim 15, wherein the program instructions further cause the processor to:
classify, by the processor, one or more inputs of the RNN-T as one or more voice activity classes in relation to a pre-trained VAD model.

17. The computer program product of claim 15, wherein the program instructions further cause the processor to:
apply, by the processor, an element wise-sum operation between the one or more outputs of the encoder and the one or more outputs of the VAD model to improve robustness to noise.

* * * * *